United States Patent [19]
Ikkala et al.

[11] Patent Number: 5,866,043
[45] Date of Patent: *Feb. 2, 1999

[54] PROCESSIBLE ELECTRICALLY CONDUCTING POLYANILINE COMPOSITIONS AND PROCESSES FOR THE PREPARATION THEREOF

[75] Inventors: Olli Ikkala; Pentti Passiniemi, both of Helsinki, Finland

[73] Assignee: Neste Oy, Espoo, Finland

[ * ] Notice: The term of this patent shall not extend beyond the expiration date of Pat. No. 5,520,852.

[21] Appl. No.: 612,585

[22] Filed: Mar. 8, 1996

Related U.S. Application Data

[63] Continuation-in-part of Ser. No. 257,115, filed as PCT/FI95/00332 Jun. 8,1995, Pat. No. 5,520,852.

[51] Int. Cl.$^6$ .............................. H01B 1/12; H01B 1/20; C08G 73/02; C08K 5/13
[52] U.S. Cl. ............... 252/500; 252/519.33; 252/519.34; 252/519.5; 252/519.53; 525/540; 528/422
[58] Field of Search ..................... 252/521, 500, 252/518, 519, 520, 519.33, 519.34, 519.5, 519.53; 525/540; 528/422

[56] References Cited

U.S. PATENT DOCUMENTS

| | | | |
|---|---|---|---|
| 4,442,187 | 4/1984 | MacDiarmid et al. | 429/213 |
| 4,935,163 | 6/1990 | Cameron | 252/500 |
| 4,983,322 | 1/1991 | Elsenbaumer | 252/500 |
| 5,006,278 | 4/1991 | Elsenbaumer | 252/500 X |
| 5,069,820 | 12/1991 | Jen et al. | 252/500 |
| 5,079,096 | 1/1992 | Miyake et al. | 428/500 |
| 5,135,682 | 8/1992 | Cohen et al. | 252/500 |
| 5,151,221 | 9/1992 | Osterholm et al. | 252/500 |
| 5,160,457 | 11/1992 | Elsenbaumer | 252/500 |
| 5,171,478 | 12/1992 | Han | 252/500 |
| 5,185,100 | 2/1993 | Han et al. | 252/500 |
| 5,205,965 | 4/1993 | Uetani et al. | 252/500 |
| 5,217,649 | 6/1993 | Kulkarni et al. | 252/500 |
| 5,232,631 | 8/1993 | Cao et al. | 252/500 |
| 5,240,644 | 8/1993 | Barry et al. | 252/500 |
| 5,246,627 | 9/1993 | Heeger et al. | 252/500 |
| 5,264,552 | 11/1993 | Abe et al. | 528/422 |
| 5,281,363 | 1/1994 | Shacklette et al. | 252/500 |
| 5,324,453 | 6/1994 | Cao et al. | 252/500 |
| 5,340,499 | 8/1994 | Karna et al. | 252/500 |
| 5,378,403 | 1/1995 | Shacklette et al. | 252/500 |
| 5,378,404 | 1/1995 | Han et al. | 252/500 |
| 5,403,913 | 4/1995 | MacDiarmid et al. | 528/495 |
| 5,422,423 | 6/1995 | Shacklette et al. | 528/422 |
| 5,520,852 | 5/1996 | Ikkala et al. | 252/521 |
| 5,648,416 | 7/1997 | Miller et al. | 524/500 |
| 5,700,399 | 12/1997 | Shimizu et al. | 252/500 |

FOREIGN PATENT DOCUMENTS

| | | |
|---|---|---|
| 0545729 | 6/1993 | European Pat. Off. . |
| 0643397 | 3/1995 | European Pat. Off. . |
| 90/13601 | 11/1990 | WIPO . |
| 92/22911 | 12/1992 | WIPO . |
| 93/24554 | 12/1993 | WIPO . |
| 93/24555 | 12/1993 | WIPO . |

OTHER PUBLICATIONS

Green, A.G. and Woodhead, A.E., Aniline–black and Allied Compounds, Part I, J. Chem. Soc., 101 (1912) 1117–1123 month not known.

Kobayashi, T. et al., Electrochemical Reactions Concerned with Electrochromism of Polyaniline Film–Coated Electrodes, J. Electroanal. Chem. 177 (1984) 281–291 month not known.

Chiang, J.C. and MacDiarmid, A.G., "Polyaniline": Protonic Acid Doping of the Emeraldine Form to the Metallic Regime, Synthetic Metals, 13 (1986) 193–205 month not known.

Salaneck, W.R. and Lundstrom, I, A Two–Dimensional–Surface "State Diagram" for Polyaniline, Synthetic Metals 13 (1986) 291–297 month not known.

Anon., Conductive Polymer is Moldable, Extrudable in Thermoplastic Blends, Plastics Technology 37 (1991) 19–20.

*Primary Examiner*—Douglas J. McGinty
*Attorney, Agent, or Firm*—Birch, Stewart, Kolasch & Birch, LLP

[57] ABSTRACT

Polymeric compositions are disclosed comprising protonated, electrically conducting polyaniline; cyclic organic compounds capable of forming ring-ring interactions with the six-membered rings of the polyaniline and hydrogen bonding with the NH groups of the polyaniline; and anionic surface active additives. According to the invention, no particular requirements are posed for the counter-ions of polyaniline, which allows for the use of non-functionilized counter-ions. The conducting polyaniline complexes of the invention are processible in the fluid-phase and exhibit significantly improved electrical properties.

7 Claims, 3 Drawing Sheets

Concept of PANI molecular recognition solvent demonstrated in the special case of substituted hydroquinone us Pat. No. 5,866,043

PROCESSIBLE ELECTRICALLY CONDUCTING POLYANILINE COMPOSITIONS AND PROCESSES FOR THE PREPARATION THEREOF

This application is a continuation-in-part of application Ser. No. 08/257,115, filed on Jun. 8, 1994, now U.S. Pat. No. 5,520,852, the entire contents of which are hereby incorporated by reference, and which was the national stage application from PCT/FI95/00332, filed on Jun. 8, 1995.

FIELD OF THE INVENTION

The present invention relates to conducting polymers. In particular, it relates to fluid-phase processible, electrically conductive polyaniline compositions and to processes for the preparation thereof as well as to shaped articles, such as parts, containers, fibers, tapes, films, coatings and the like, produced from the present polyaniline compositions. The invention also concerns the use of the compositions and conductive articles.

BACKGROUND OF THE INVENTION

Electrically conductive, thermoplastic polymer compounds are of increased practical interest, e.g., for packaging electronic instruments and parts, and for solving a wide range of static discharge, electrostatic dissipation and electromagnetic shielding problems. Often, such compounds are made by mixing solid conductive particles such as carbon black, stainless steel fibers, silver or aluminum flakes or nickel-coated fibers with insulating bulk thermoplastics, for example polystyrene, polyolefins, nylons, polycarbonate, acrylonitrile-butadiene-styrene co-polymers (ABS), and the like.

Recently, there has been an increased interest in replacing carbon black or metal particle-filled compounds of the above-described type with intrinsically electrically conductive polymers and their blends with common insulating polymers. The latter systems are believed to be more economical, easier to process and to exhibit desirable mechanical properties. Among the various conductive polymers, the polyanilines have, in particular, attracted special attention because of their excellent environmental stability and low production costs.

Polyaniline (or abbreviated PANI) is well known in the art, and its synthesis and the preparation of the electrically conductive form of this polymer by, for example, contacting polyanilines with protonic acids resulting in salt complexes has been described in great detail in the prior art [cf., for instance, Green, A. G., and Woodhead, A. E., "Aniline-black and Allied Compounds, Part 1," J. Chem. Soc., Vol. 101, pp. 1117 (1912); Kobayashi, et al., "Electrochemical Reactions . . . of Polyaniline Film-Coated Electrodes," J. Electroanl. Chem., Vol. 177, pp. 281–91 (1984); U.S. Pat. Nos. 3,963,498, 4,025,463, 4,983,322 and 5,232,631; Chiang, J.-C. and MacDiarmid, A. G., "Polyaniline: Protonic Acid Doping of the Emeraldine Form to the Metallic Regime", Synthetic Metals, Vol. 13, p. 196 (1986); Salaneck, W. R. et al., "A Two-Dimensional-Surface "State" Diagram for Polyaniline", Synthetic Metals, Vol. 13, p. 297 (1986)]. Typical examples of protonic acids disclosed in the above prior art are HCl, $H_2SO_4$, sulfonic acids of the type $R_1$—$SO_3H$, wherein $R_1$ stands for an hydrocarbon residue, phosphoric acids, etc. Such acids form salt complexes with polyaniline, which may exhibit electrical conductivities of $10^{-3}$ S/cm or more. Owing to their electrical properties, these so-called "doped" polyanilines [or, as used hereinafter, polyaniline salt complexes], and their blends and compounds with common insulating bulk polymers, are suitable for a variety of the anti-static and shielding applications that are currently served by metal or carbon black filled polymer composition.

Processing of polyanilines in different forms is discussed in several patents and patent applications and a summary of the content of some publications are given below. Major distinctions exist in the techniques employed and final materials properties, depending on whether the polyanilines are processed in the non-doped/non-conducting or conducting salt complex form, and whether the material is in solid or liquid phase during the processing operation. Generally, it is preferred to have the polyaniline in its conductive salt complex form and in fluid phase during processing. The former condition eliminates the need for post-processing doping, which is cumbersome and uneconomical, whereas the latter allows as well for the formation of more homogeneous products as for the production of a greater variety of products in comparison with the limited possibilities encountered in solid state processing.

U.S. Pat. No. 5,006,278 teaches the preparation of a conductive product by mixing a liquid, a doping agent and an undoped polyaniline. The liquid is removed by evaporation. PCT Patent Application WO 89/01694 discloses a processible polyaniline doped with a sulfonic acid. Said polyaniline is useful in processing conducting polymer blends using polyethylene, polypropylene and polyamides as the matrix polymer. According to PCT Patent Specification WO 90/13601 a polymer mixture is prepared by mixing a suitable liquid with a mixture of polyaniline and a multisulfonic acid, used as a doping agent, whereafter the liquid is evaporated. According to said specification, the doping is generally carried out at a temperature of 20° to 25° C., and it is disclosed that the doping can be carried out as a heterogeneous reaction, followed by dissolution of the mixture in a suitable solvent. The processing into a final shape is carried out in the presence of a solvent. PCT Patent Application WO 90/10297, EP Patent Application No. 152 632 and U.S. Pat. No. 5,002,700 all disclose the use of dodecylbenzenesulfonic acid as a doping agent for polyaniline. PCT Patent Application WO 90/01775 describes the use of multisulfonic acids as doping agents for polyaniline with the advantage of better thermal stability compared with other sulfonic acids. In the examples of said application, the doping of polyaniline has been carried out in a suspension of polyaniline and the sulfonic acid in an aqueous solution of formic acid. PCT Patent Application WO 93/24554 describes the use of dopant anion substituted with one or more polar group(s) which are preferably hydrogen bonding. PCT Patent Specification WO 93/24555 describes the use of several dopant anions simultaneously, the electrically conducting polymer preferably being in particle form.

The above prior art publications fail to disclose any adequate and economical methods for processing of conductive polyanilines simply in their fluid form; i.e. by, for instance, classic melt processing techniques employed in the thermoplastic polymer industry. Instead, the prior art publications teach quasi-melt processing of compounds comprising conductive polyanilines by mechanically mixing of the components, the conductive polyaniline being in solid phase and only the matrix polymer being in molten form, before shaping the blend into the desired article. Generally, the blends obtained in this manner exhibit varying conductivity, they are very often non-homogeneous and, generally show poor mechanical properties and require a high content of polyaniline particles for the onset of electrical conductivity. In that sense such—erroneously labeled—"melt"—processible conductive thermoplastics closely resemble the well-known carbon black or metal particle-filled systems described above.

A relatively high content of conductive polyaniline is required to reach desirable levels of conductivity in the polyblend; or, in other words, the percolation threshold for the onset of conductivity is relatively high. As used hereinafter, the "percolation threshold" is defined as the weight fraction of conductive material needed to impart a conductivity of $10^{-8}$ S/cm or more to a blend with an insulating matrix polymer. Thus, in the afore-mentioned blends of solid polyaniline particles dispersed in poly(vinylchloride) a percolation threshold existed of about at least 13 wt-% of the conductive polyaniline. Such high content of conductive polyaniline particles is not desirable, because it is not economical and, in addition, may substantially alter the mechanical properties of the blend in comparison with those of the pure matrix polymer.

An improved method of making homogeneous conductive polyaniline complexes in a semi-fluid phase, and blends of reduced percolation threshold has been disclosed in EP Patent Application 545 729. According to this application, polyaniline, or derivatives thereof, and an excess of a functionalized organic protonic acid are mechanically mixed. A liquid-like mixture or suspension is obtained which subsequently is thermally solidified between at a temperature in the range of 40° to 250° C. As a result, a dry, solid composition is obtained in the form of a granulate comprising a functionalized protonic acid-doped polyaniline. The latter composition can subsequently be mixed with a thermoplastic polymer and formed into parts of desired shapes using standard polymer melt-processing techniques. Percolation thresholds for the onset of conductivity of parts made according to this method were lower than in the case where solid polyaniline particles were mixed with thermoplastic matrix materials. However, use of the required excess quantity of protonic acid is highly undesirable, as it causes the materials to be acidic, corrosive and hygroscopic, which is undesirable for processing and application of these compositions.

U.S. Pat. No. 5,232,631 discloses solution- and melt-processible polyaniline compositions and blends that exhibit much lower percolation thresholds, sometimes even below 1 wt-%, of conductive polyaniline and a wide variety of non-conducting matrix polymers; such as, polyethylenes, isotactic polypropylene, elastomers, and the like; poly (vinylchloride), polystyrene, polyamides, such as PA 6, PA 12, and the like; poly(methylmethacrylate), polycarbonate, acrylonitrile-butadiene-styrene copolymers (ABS), and the like. However, in the reference the compositions that exhibit a low percolation threshold, invariably, are made from solutions of the conductive polyaniline and the matrix polymers in volatile organic solvents, which is uneconomical and environmentally hazardous and limits the use to products such as film, coatings and fibers. The same reference discloses mixtures of conductive polyaniline and insulating matrix polymers, such as polyethylenes and isotactic polypropylene, which are processed from the melt. However, in the examples shown, the percolation threshold was only slightly lower than for mixtures in which the conductive polyaniline is in the solid form during processing and simply dispersed; cf. Plastics Technology 37 (1991):9 p. 19–20. In addition, U.S. Pat. No. 5,232,631, and EP Patent Application No. 545,729 teach that, in order to process conductive polyaniline from the melt and affect even a modest reduction in percolation threshold, an excess of protonic acid is needed, which renders the final blend undesirably acidic. As was pointed out above, the latter generally is unacceptable from a processing, application and environmental point of view. The excess acid, of course, can be removed, but this process is tedious and uneconomical, and limits the scope of the products that can be manufactured.

EP Patent Application No. 582,919 teaches the use of reaction products of metal compounds and protonic acids as plasticizers for conducting polyanilines and for reducing the percolation threshold for the onset of conductivity in blends comprising bulk polymers; and for neutralizing acidic, protonated polyaniline compositions. This reference specifically teaches the use of the reaction product between zinc oxide and dodecylbenzenesulfonic acid as a plasticizer and neutralization agent for conducting forms of polyaniline and blends thereof. The use of the afore-mentioned reaction product in conducting polyaniline compositions, however, involves additional process steps that are unoconomical and reduce the environmental stability of the final materials. In addition, manufacturing of the above metal oxide-acid reaction products involves large amounts of highly corrosive and highly hygroscopic acids, which is unacceptable from a production and processing point of view.

Generally, the use of plasticizers are well known to those skilled in the art of polymer technology, and, not surprisingly, has also been employed in conductive polymer processing, cf. EP Patent Application No. 497,514, U.S. Pat. No. 5,171,478 and PCT Patent Application WO 92/22911. Typically, plasticizers are used to enhance flow, and/or reduce the viscosity of polymeric materials during processing; and generally form a part of the polymer composition. Along these well-known uses, EP 497,514 cited supra teaches the use of highly polar, ester-free plasticizer to plasticize the thermoplastic component of polymer blends comprising polyaniline. According to the reference, the plasticizer is selected to facilitate the flow only of the thermoplastic matrix, such as poly(vinyl chloride); and not to induce flow, or dissolve the polyaniline.

U.S. Pat. No. 5,171,478, teaches the use of an extraordinary wide variety of chemical species termed plasticizers, ranging from water, p-toluene sulfonic acid to synthetic waxes and fluorinated hydrocarbons, to assist in thermally induced chain coupling of polyaniline which, according to the text, should be in the solid state. Clearly, as is evident from the latter statement, and judging from their chemical nature, the suggested "plasticizing" species are not intended to facilitate flow, or dissolve the polyaniline component in the compositions.

Conventional use of commercially available plasticizers is discussed in WO 92/22911. For example, Mesamoll (Bayer) was employed in a blend of conductive polyaniline and poly(vinyl chloride). However, Mesamoll is not a solvent for conductive polyaniline, and much like in the results in the above cited Plastics Technology 37 (1991):9 p. 19–20 a percolation threshold existed of more than 10% w/w of the conductive polyaniline.

Thus, in summary, there still clearly exists a need for electrically conductive polyaniline compositions which can be processed in the fluid state and which have low percolation thresholds. In particular, there is a need for fluid-phase processible electrically conductive polyaniline composition which are doped with non-functionalized counter-ions by using mineral acids, such as sulfuric acid or hydrochloric acid, because such non-funtionalized counter-ions will allow for simplified processing of the compositions and polymer blends prepared from the compositions.

SUMMARY OF THE INVENTION

It is an object of the present invention to eliminate the drawbacks of the prior art and to provide electrically conductive compositions, which comprise electrically conducting polyaniline salt complexes that exhibit improved processibility and reduced acidity.

It is a second object of the present invention to provide methods for preparing polyaniline complexes which impose no special functional requirements on the counter-ions and which methods, in addition, optionally allow for simpler processing of polyaniline by overcoming the unstable emeraldine base phase and corrosive protonation by strong, functionalized protonic acids.

It is a third object of the present invention to provide electrically conductive compositions of conducting polyaniline salt complexes of improved processiblity and reduced acidity.

It is a fourth object of the present invention to provide conductive blend compositions that exhibit improved processibility, reduced acidity, and reduced percolation thresholds for the onset of conductivity, comprising insulating or semiconducting bulk polymers and pre-polymers, electrically conductive polyaniline salt complexes wherein the counter-ions of the polyaniline salts need not be functionilized.

It is a fifth object of the present invention to provide shaped articles, fibres, coatings, films, tapes and the like from electrically conductive compositions comprising electrically conducting polyaniline salt complexes.

It is a sixth object of the present invention to provide shaped articles, fibres, coatings, films, tapes and the like from electrically conductive compositions comprising electrically conducting polyaniline salt complexes.

These and other objects and advantages are achieved by the present invention which is based on the surprising finding that the above objects can be achieved by combinations of polyaniline polymers with specific cyclic organic compounds and selected surfactants. During processing the latter components together simultaneously act as:

i. solvents for electrically conductive polyaniline salt complexes during processing; in which case there is no specific need to functionalize the counter-ion for processibility; and ii. compatibilizers in blends with insulating or semiconducting bulk polymers; thus yielding drastically reduced percolation thresholds for the onset of conductivity of such blends.

The above-mentioned combinations are based on either molecular recognition compounds that simultaneously form at least three of: one or more hydrogen bonds and one or more ring-ring interactions with, respectively, the NH-groups and the six-membered rings of the electrically conducting polyaniline salt complexes with anionic sulfate, sulfonate, phosphate, or phosphonate type surfactants; or a combination of aromatic sulfonamides with zinc sulfonates.

More specifically, the compositions according to the invention are mainly characterized in that they comprise admixtures of:

(a) at least one electrically conductive polyaniline polymer selected from the group consisting of electrically conducting, protonated polyaniline, substituted polyanilines, and copolymers thereof;

(b) at least one cyclic organic compound capable of forming ring-ring interactions with the 6-membered rings of the polyaniline polymer and hydrogen bonding with the NH groups of said polyaniline, (c) at least one surface active additive, said cyclic organic compound together with said surface active additive being capable of dissolving said electrically conductive polymer.

The processes for preparing electrically conducting polymeric compositions, basically comprise the steps of preparing a protonated polyaniline polymer selected from the group consisting of polyaniline, substituted polyanilines, and copolymers thereof, with a mineral acid, in order to provide an electrically conducting polyaniline polymer; and admixing said electrically conducting polymer with a surface active additive and with a cyclic organic compound capable of forming ring-ring interactions with the 6-membered rings of the polyaniline polymer and hydrogen bonds with the NH groups of said polyaniline, in order to provide an electrically conducting polymer composition.

Additional objects, advantages and novel features of the invention will be set forth, in part, in the description which follows, and, in part, will become apparent to those skilled in the art on examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
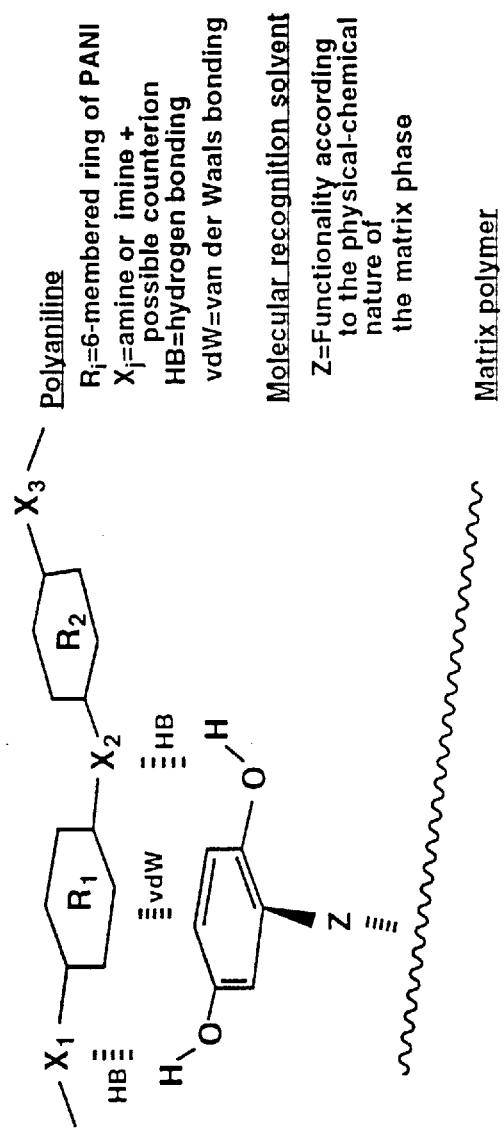
FIG. 1 depicts, in a schematic fashion, the interactions of substituted hydroquinone with the substituted aromatic compound of a polyaniline salt complex; hydroquinone is an example of a molecular recognition compound of polyaniline.

The electrically conducting compositions of this invention typically comprise the following ingredients or components:

(i) At least one electrically conducting unsubstituted or substituted polyaniline polymer or co-polymer salt complexes, or mixtures thereof.

It is a special feature of the present invention that, unlike the previous inventions, no other requirements are posed for the counter-ions except for an ability to dope polyaniline. Specifically, the counter-ion does not have to be a functionalized or substituted benzene sulfonic acid, such as alkyl benzene sulfonic acid, e.g. dodecyl benzene sulfonic acid (DBSA) or methyl benzene sulfonic acid (TSA), or camphor sulfonic acid (CSA) or the like. Instead, essentially any type of counter-ion or dopant, capable of doping PANI to render it electrically conductive, can be used. The most preferred counter-ions are $H_2SO_4$ and HCl, which in the most preferred case lead directly to polyaniline hydrogen sulfate and polyaniline hydrogen chloride, respectively, in polymerization.

(ii) At least one organic cyclic compound which is capable of forming ring-to-ring interactions with the 6-membered rings of the polyaniline polymer and hydrogen bonding with said polyaniline. The materials used have low polarity (i.e., dielectric constant less than about 25). Said cyclic compounds, which are not capable of protonating the polyaniline ($PK_a > 3$), are comprised of 1) sulfonamides or 2) molecular recognition compounds, the latter simultaneously forming at least three of: one or more hydrogen bonds and one or more ring-to-ring interactions with, respectively, the NH-groups and the six-membered rings of the electrically conducting polyaniline salt complexes.

(iii) At least one surfactant phase, preferably an anionic surfactant of the sulfonate, sulfate, phosphonate or phosphate type, the sulfonates and sulfates being preferred, and alkyl benzene sulfonate, alkyl sulfonate, alkyl benzene sulfate, or alkyl sulfate being particularly preferred. As particular embodiments of the particularly preferred species the salts of dodecyl benzene sulfonic acid, such as $Zn(DBS)_2$, NaDBS or the like more particularly $Zn(DBS)_2$, should be mentioned. In the case of sulfonamides, zinc sulfonates are particularly preferred.

(iv) Optionally at least one organic substrate phase. This phase is an insulating or semiconducting material, and can be comprised of at least one polymer or prepolymer, or mixtures thereof, which is fluid during compounding or mixing with (i) and (ii) and/or during shaping into the conductive article.

Surprisingly, we have found that, unlike the electrically conductive compositions described in the prior art, the materials according to the present invention, which do not contain an excess protonic acid, i. can optionally be prepared directly from the doped polyaniline without any need for reducing it into the unstable emeraldine base form;

ii. do not require separate protonation process step by corrosive functionalized protonic acids;

iii. display outstanding processability in the fluid form, i.e. as a solution or in the melt phase;

iv. are substantially less acidic; and v. are less hygroscopic; and, in addition, in blends with insulating or semiconducting matrix polymers:

vi. exhibit improved compatibility between the conducting polyaniline salt complex and the matrix material; which results in vii. a remarkably low percolation threshold for the onset of conductivity.

It should be pointed out that polyaniline protonated by the above-described non-functionalized counter-ions, such as $H_2SO_4$, HCl and the like, is more difficult to solubilize, plasticize and compatibilize than PANI protonated by specially functionalized counter-ions. Therefore, it is clear to a person skilled in the art that the present concept for solubilizing and compatibilizing PANI($H_2SO_4$), PANI(HCl) and the like, which is disclosed herein, can be applied also to polyaniline protonated by functionalized counter-ions, such as DBSA, TSA, CSA and the like, in which case synergistic phenomena are expected to give rise to high conductivity polymer blends.

The present conducting polyaniline compositions comprising both said molecular recognition compounds and surfactants open a new field of development which allows for enhanced processability and electrical conductivity of blends which were previously obtainable only by special counter-ions.

The Electrically Conducting Polyaniline

One component of the present compositions comprises an electrically conducting unsubstituted or substituted polyaniline salt complex or an electrically conducting polyaniline copolymer salt complex, or mixtures thereof, as described in U.S. Pat. Nos. 5,069,820 and 5,160,457 and U.S. Pat. No. 5,232,631.

When the term "electrically conducting polyaniline salt complex" is used in this application, it is used generically to denote electrically conducting unsubstituted and substituted polyanilines and electrically conducting polyaniline copolymers, and mixtures thereof, that have been rendered electrically conducting by applying one or more strong protonic acids as counter-ions with $pK_a$ value of less than about 3.0.

In a preferred embodiment of the present invention polyaniline is directly polymerized in the presence of the said protonic acids, such as $H_2SO_4$, HCl, or the like, leading to doped polyaniline. In this case, the doped polyaniline can be directly used without reduction to emeraldine base form.

In another embodiment the emeraldine base form of PANI is prepared to produce non-conducting polyaniline, which is subsequently protonated by a strong protonic acid with a pKa value of less than about 3.0. No requirements are posed on the functionalization of the counter-ion. Thus, the known emeraldine base intermediate process step is employed in this embodiment, but instead of being limited to the use of functionalized counter ions such as DBSA, TSA or CSA, essentially any strong protonic acid is usable according to the present invention.

The polyaniline used for the preparation of the electrically conducting polyaniline employed in the present invention can be in any of its physical forms. Illustrative of useful forms are those described in U.S. Pat. Nos. 5,232,631 and 4,983,322, incorporated by reference herein. For unsubstituted polyaniline, useful forms include leucoemeraldine, protoemeraldine, emeraldine, nigraniline and pernigraniline forms. Useful polyanilines can be prepared by any chemical and electrochemical synthetic procedures referred to, for example, in the above publications incorporated herein by reference.

In general, the forms of polyanilines useful for the preparation of the electrically conductive polyaniline used in implementing this invention are those which are of sufficiently high molecular weight to exhibit high electrical conductivity; i.e. those polyanilines having a weight average molecular weight of more than 5,000 daltons. In general, substituted and unsubstituted polyanilines and polyaniline copolymers will be of at least 20 repeating units. In the preferred embodiments of the invention, the number of repeating units is at least about 25, and in the most preferred embodiments, the number of repeating units is at least about 50.

The organic cyclic compound

The second, essential component of the compositions of the present invention is comprised of the cyclic organic compounds which are capable of forming ring-to-ring interactions with the 6-membered rings of the polyaniline polymer and hydrogen bonds with the NH groups of said polyaniline. In combination with the third component of the present compositions, the surface active additives, such as anionic sulfonate, sulfate, phosphonate or phosphate surfactants, the organic compounds work as "solvent-plasticizers" of the conductive polyaniline composition especially when the counter ion is not functionalized; and, additionally, as "compatibilizers" in blends, wherein the conductive polymer is compounded with insulating or semi-conductive polymers or pre-polymers.

Within the context of the present invention, in general, by ring-to-ring interactions between, e.g., two phenyl rings is meant van der Waals interaction which consists of attractive and repulsive parts. The attractive part consists mainly of induced dipolar interactions while the repulsive part is due to Pauli exclusion principle. There may also be a weak Coulombic interaction. The induced dipolar interaction between two atoms is very weak and significant attraction can be achieved only when the distance between the interacting atoms is proper. The induced dipolar interaction can be enhanced if several atoms simultaneously meet the favourable distance requirement. A simple example of such a situation is the ring-to-ring interaction between two phenyl rings. The same type of interaction benefitting from several favourable interatomic distances can be observed between a phenyl ring and an alicyclic ring, or two alicyclic rings, albeit especially in the latter case the interaction can be critically dependent on the relative position of the rings. The backbone of the protonated polyaniline consists of six-membered rings that are able to have said ring-to-ring interaction with phenyl rings or alicyclic rings of the molecular recognition compound or aromatic sulfonamides, respectively.

As mentioned above, the organic cyclic compounds or additives capable of forming ring-ring interactions with the 6-membered rings of the polyaniline polymer and hydrogen bonding with said polyaniline are, according to the present invention, either molecular recognition compounds or aromatic sulfonamides. These materials have low polarity (dielectric constant less than 25 and they are not capable of protonating polyaniline ($PK_a$>3). Thus, in the present polymeric compositions, the cyclic organic compound capable of forming ring-to-ring interactions with the polyaniline are different from the protonic acid dopant of polyaniline.

The molecular recognition compounds and the sulfonamides are employed in combination with surfactants. This unique combination renders conductive polyaniline polymers, which have been doped without functionalized counter-ions, fluid during processing. It enhances flow, and reduces the percolation threshold in blends with insulating or semiconducting polymers.

The molecular recognition compounds according to the present invention are comprised of cyclic organic compounds having the general formula I

wherein:
i is an integer greater than 0; and
j is an integer greater than 0, with the proviso that the sum of i and j is equal to or greater than 3;
A is a moiety capable of forming ring-ring interactions with the six-membered rings of electrically conducting polyaniline complexes; each A being independently selected from the group consisting of optionally substituted 3- to 7-membered rings, which rings may optionally include at least one nitrogen, sulfur or oxygen atom, and optionally substituted condensed ring systems thereof; and
B is a moiety capable of forming hydrogen bonds to NH-groups of electrically conducting polyaniline complexes, each B being independently selected from the group consisting of —OH, —COOH, —COO—$Q_1$, —CO—$Q_1$, —SO—$Q_1$, —$SO_2$—$Q_1$, —$SO_2$NH—$Q_1$, —OCOO—$Q_1$, —O—$Q_1$, —SH, —S—$Q_1$, —P(O)(O—$Q_1$)(O—$Q_2$), —$NO_2$, —CN, —CONH—$Q_1$, —F, —Cl, —Br, and —I , wherein $Q_1$ and $Q_2$ are aliphatic or aromatic moieties.

According to one embodiment, each A is independently selected from the group consisting of 5 or 6-membered aromatic rings, which rings may be optionally substituted and which may further include at least one nitrogen, sulfur or oxygen atom; and their substituted or unsubstituted condensed rings; and at least one B is —OH. A can be the same on each occurrence or different on at least two occurrences.

As will be demonstrated in the following description of the invention, and more specifically illustrated in the Examples attached hereto, the particular geometric arrangements of the various substituents of the MRC's in combination with particular surfactants are unexpectedly useful.

According to the present invention, it has now been surprisingly found that it is possible to find combinations of molecular recognition compounds and surfactants which during processing dissolve the electrically conductive polyaniline salt complexes doped with non-functionalized counter-ions such as $H_2SO_4$ or HCl or the like, and form strong molecular associations with them. As will appear from the examples below, polyaniline salt complexes doped with non-functionalized counter ions such as $H_2SO_4$ or HCl or the like do not dissolve in said molecular recognition compounds or said surfactants alone at least at temperatures that are preferred for polyaniline processing.

The conductive polyaniline salt complexes according to the present invention are in fluid form during processing, which has the above described major advantages with regard to product homogeneity, properties, and shaping options.

Unlike commonly used solvents, the molecular recognition compounds in combination with surfactants according to the present invention form a permanent and integral part of the compositions. In addition, depending on the specific properties of the molecular recognition compounds, such solvates may exhibit unusual electrical, optical magnetic and mechanical characteristics.

The second important role of the molecular recognition compounds of the present invention is that of a "compatibilizer" in blends of the conductive polyaniline complexes and insulating or semiconductive polymers or prepolymers. The designation "compatibilizer" hereinafter refers to a species that improves the interaction between two immiscible liquid phases through close matching of the physicochemical nature of the species and the two liquids. Thus, for example, common surface active agents reduce the interfacial tension of water and oil, and, thereby "compatibilize" these two liquids, as it is understood in this invention. This compatibilizing is achieved in this simple example by providing a species [the surface active agent] that has two, covalently bonded moieties: one of which that strongly interacts with water; and the other moiety that has a favorable interaction with oil. The compatibilizing role of the substituted aromatic compounds according to the present invention in blends of the conducting polyaniline complexes and insulating or semiconductive polymers is similarly understood. For example, in blends of the conducting polyaniline complexes with insulating polymers selected from the group of polar polymers, such as nylons, the molecular recognition compounds shall have a moiety that favorably interacts with the polar polymers, and hence contain common polar groups such as, for example —OH, —O—, —COOH, —COO—$Q_1$, —CO—$Q_1$, —SO—$Q_1$, —$SO_2$—$Q_1$, —$SO_2$NH—$Q_1$, —OCOO—$Q_1$, —O—$Q_1$, —SH, —S—$Q_1$, —P(O)(O—$Q_1$)(O—$Q_2$), —$NO_2$, —CN, —CONH—$Q_1$, —F, —Cl, —Br, and —I, wherein $Q_1$ and $Q_2$ are aliphatic or aromatic moieties. Alternatively, in blends with non-polar or weakly polar polymers, such as polyethylene, polypropylene, and the like, the molecular recognition compound shall have a non-polar or weakly polar moiety, such as alkyls, alkenyl, cycloalkyls, phenyls, and the like. In the case of polystyrene or polymers with aromatic nature the molecular recognition compound has to fit to the aromatic character of the matrix polymer. Clearly, the selection of the appropriate compound from the various molecular recognition compounds, to be specified in detail hereafter, for optimum use in blends with insulating or semiconductive polymers is guided by the physico-chemical nature of the latter, according to the well-established rules of chemical affinity known to those skilled in the art.

The critically important feature of the molecular recognition compounds according to the present invention is that they are capable of simultaneously forming hydrogen bonds and ring-to-ring interactions with, respectively, the NH-groups and the six-membered rings of conducting polyaniline salt complexes. This unique behavior requires that the molecular recognition compounds has to fit in with the steric features of the polyaniline salt complex; the distances between the hydrogen bonding moieties and rings of the molecular recognition compounds have to match the corresponding distances of the polyaniline salt complex. The corresponding mechanisms are known in biological sciences where they are known as Fischer's lock and key notion of enzyme action, inclusion complex, host-guest complex or molecular recognition.

The schematics of the molecular recognition compound concept is demonstrated in the FIG. 1 where the "lock and key" aspect can be appreciated in the special case of substituted hydroquinones.

It is also envisaged that the molecular recognition compounds are part of oligomeric or polymeric chain molecules; in the polymer chain or as pendant side-groups. Such oligomeric or polymeric substituted compounds can be prepared according to the usual polymerization or functionalization and substitution methods known to those skilled in the art of synthesis of oligomers and polymers. For example, in one embodiment, the molecular recognition compounds of the present invention comprise a polymerizable moiety, such as substituted and unsubstituted unsaturated C—C bonds, or moieties that can be polymerized by well-known polycondensation methods, and the like. Such polymerizable compounds can be polymerized to yield an oligomeric or polymer chain comprising a multitude of substituted aromatic functional groups useful according to the present invention.

In another embodiment, oligomeric and polymeric materials can be functionalized with one or more substituted aromatic moieties according to the present invention. Such functionalization can be carried out according to any technique well known to those skilled in the art of substituted and functionalized polymers.

According to a preferred embodiment, the molecular recognition compounds comprise aromatic compounds having the Formula (II)

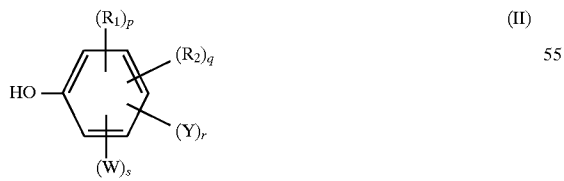

wherein:
p, q, r, and s are integers having a value in the range of 0 to 5, with the proviso that
the sum of p and q and r and s is equal to 5;
each $R_1$ represents H, —OH, —F, —Cl, —CH$_3$ or —OCH$_3$, whereby at least one of the H's in —CH$_3$ or —OCH$_3$ can be substituted by —F or —Cl;

each $R_2$ is independently selected from the group consisting of of —H, —OH, alkyl, alkenyl, alkoxy, alkanoyl, alkylthio, alkylthioalkyl, alkyl amide, alkylamidealkyl, alkyl hydroxy, alkyl carboxyl, having from 1 to about at least 20 carbon atoms; or alkylaryl, arylalkyl, alkylsulfinyl, alkoxyalkyl, alkylsulfonyl, alkoxycarbonyl, wherein the alkyl or alkoxy has from 0 to about 20 carbon atoms; or alkyl having from 1 to about 20 carbon atoms; or any two $R_2$ groups together may form an alkylene or alkenylene chain completing a 3 to 7-membered aromatic or alicyclic ring, which ring may optionally include at least one nitrogen, sulfur or oxygen atom; $R_2$ can be branched and can be tert-alkyl, the alkyl having from 1 to about 20 carbon atoms; $R_2$ may include at least one polar substituents selected from the group consisting of —NO$_2$, —CN, —F, —Cl, —Br, and —I;

each Y is independently selected from the group consisting of —OH, —COOH, —COO—Z, —CO—Z, —SO—Z, —SO$_2$—Z, —SO$_2$NH—Z and —OCOO—Z, wherein Z represents an alkyl having 1 to about 20 carbon atoms preferably more than about 10 carbon atoms; and each W is selected from the group consisting of of substituents with the formulas $X_1$, —C(C$_n$H$_{2n+1}$)(C$_m$H$_{2m+1}$)—X$_1$, wherein n and m are integers from 1 to about at least 20, —COO—X$_1$, —CO—X$_1$, —OCO—X$_1$, —CH$_2$—O—X$_1$, —O—CH$_2$—X$_1$, —O—X$_1$, —S—X$_1$, —SO—X$_1$, —SO$_2$—X$_1$, —SO$_2$NH—X$_1$, —OCOO—X$_1$, —COO—CH$_2$—X$_1$, —OCO—CH$_2$—X$_1$, —CH$_2$—COO—X$_1$, —CH$_2$—OCO—X$_1$, —O—C$_2$H$_4$—O—X$_1$, —CH$_2$—X$_1$, cyclohexane, or 5 or 6-membered aromatic, heteroalicyclic, heteroaromatic or alicyclic carbon ring.

$X_1$, in the above formulas represents a group of the formula (III)

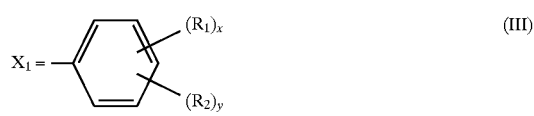

wherein:
x and y are integers from 0 to 5 with the proviso that the sum of x and y equals 5; and
$R_1$ and $R_2$ are as defined above.

Thus, the aromatic molecular recognition compound can be selected from the group consisting of substituted aromatic compounds of Formulas (IV) to (X)

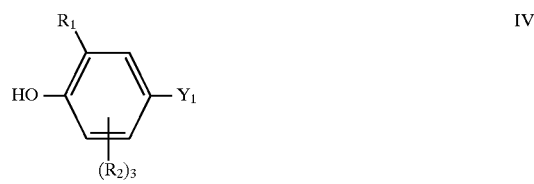

-continued

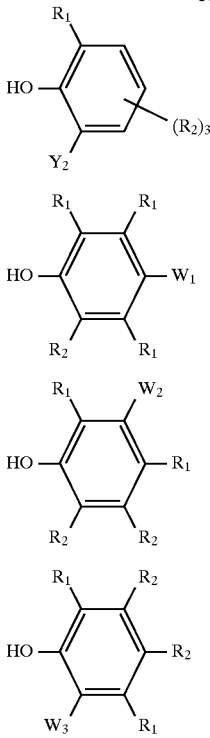

wherein:
  each $R_1$ represents H, —OH, —F, —Cl, —$CH_3$ or —$OCH_3$, whereby at least one of the H's in —$CH_3$ or —$OCH_3$ can be substituted by —F or —Cl;
  each $R_2$ is independently selected from the group consisting of of —H, —OH, alkyl, alkenyl, alkoxy, alkanoyl, alkylthio, alkylthioalkyl, alkylamide, alkylamide alkyl, alkylhydroxy, alkylcarboxyl, having from 1 to about at least 20 carbon atoms; or alkylaryl, arylalkyl, alkylsulfinyl, aikoxyalkyl, alkylsuffonyl, alkoxycarbonyl, wherein the alkyl or alkoxy has from 0 to about 20 carbon atoms; or alkyl having from 1 to about 20 carbon atoms; or any two $R_2$ groups together may form an alkylene or alkenylene chain completing a 3 to 7-membered aromatic or alicyclic ring, which ring may optionally include at least one nitrogen, sulfur or oxygen atom; $R_2$ can be branched and can be tert-alkyl, the alkyl having from 1 to about 20 carbon atoms; $R_2$ may include at least one polar substituent selected from the group consisting of —$NO_2$, —CN, —F, —Cl, —Br, and —I;
  each $Y_1$ is independently selected from the group consisting of —OH, —COOH, —COO—Z, —CO—Z, —SO—Z, —$SO_2$—Z, —$SO_2$HN—Z and —OCOO—Z, wherein Z represents an alkyl having 1 to about 20 carbon atoms preferably more than about 10 carbon atoms;
  each $Y_2$ is —OH;
  each $W_1$ is independently selected from the group consisting of substituents of formulas $X_1$, —C($C_nH_{2n+1}$) ($C_mH_{2m+1}$)—$X_1$, wherein n and m are integers from 1 to about at least 20, —COO—$X_1$, —CO—$X_1$, —OCO—$X_1$, —$CH_2$—O—$X_1$, —O—$CH_2$—$X_1$, —O—$X_1$, —S—$X_1$, —SO—$X_1$, —$SO_2$—$X_1$, —$SO_2$NH—$X_1$, —OCOO—$X_1$, cyclohexane, or 5 or 6-membered aromatic, heteroalicyclic, heteroaromatic or alicyclic carbon ring;
  each $W_2$ is independently selected from the group consisting of substituents of formulas $X_1$, —C($C_nH_{2n+1}$) ($C_mH_{2m+1}$)—$X_1$, wherein n and m are integers from 1 to about at least 20, —COO—$X_1$, —CO—$X_1$, —OCO—$X_1$, —O—$X_1$, —S—$X_1$, —SO—$X_1$, —$SO_2$—$X_1$, —$SO_2$NH—$X_1$, —OCOO—$X_1$, —COO—$CH_2$—$X_1$, —OCO—$CH_2$—$X_1$, —$CH_2$—COO—$X_1$, —$CH_2$—OCO—$X_1$, —O—$C_2H_4$—O—$X_1$, cyclohexane, or 5 or 6-membered aromatic, heteroalicyclic, heteroaromatic or alicyclic carbon ring; and
  each $W_3$ is independently selected from the group consisting of substituents of formulas $X_1$, —C($C_nH_{2n+1}$) ($C_mH_{2m+1}$)—$X_1$, wherein n and m are integers from 1 to about at least 20, —COO—$X_1$, —CO—$X_1$, —OCO—$X_1$, —O—$X_1$, —S—$X_1$, —SO—$X_1$, —$SO_2$—$X_1$, —OCOO—$X_1$, —$CH_2$—$X_1$, cyclohexane, or 5 or 6-membered aromatic, heteroalicyclic, heteroaromatic or alicyclic carbon ring; and
  each $X_1$ stands for a group of formula (X)

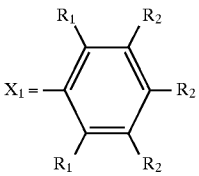

wherein $R_1$, and $R_2$ are as defined above.

In Formulas (IV) to (X), at least one of the substituents $R_1$, $R_2$, $Y_1$, $Y_2$, $W_2$ and $W_3$ which is adjacent to at least one —OH substituents on any benzene ring, can be selected from the group consisting of —H and —OH.

It should be pointed out that aromatic sulfonamides, in combination with zinc sulfonates, are able to perform as solvent plasticizers by analogy with molecular recognition compounds (which work with a broader group of anionic surfactants). The aromatic sulfonamides can be viewed as compounds that resemble molecular recognition compounds: they have only one hydrogen bonding moiety but it has very large partial charge.

Such embodiments are fully anticipated and comprised within the scope and embodiments of this invention.

The surfactant phase

In order to render solubilized PANI salt complex without functionalized counter ions, surfactant phase is a novel and essential component of the present PANI compositions in addition to the molecular recognition compound.

Surfactants are amphiphilic compounds which have two types of groups of opposing nature in the molecules. One of the groups is easily mixed with water (i.e. hydrophilic) while the other end mixes with oils (hydrophobic). The main groups of surfactants are anionic, cationic, nonionic and amphoteric surfactants. The preferred surfactants in this patent specification are anionic surfactants and still the most preferred surfactants are the ones which have a strongly anionic moiety, such as sulfonate, sulfate, phosphate and phosphonate, as the hydrophilic moiety. The yet still most preferred group is sulfonate or sulfate. Examples of such compounds are well known detergents; such as alkyl sulfonates, alkyl benzene sulfonates, naphthalene sulfonates, α-olefin sulfonates, lignosulfonates, dialkyl sulfosuccinates, taurates, alkyl sulfates, ethoxylated sulfates, ethoxylated and sulfated alkyl phenols phosphate esters, phosphonates.

The selection of the metal cation depends on the solvent used, formulation and mixing temperature and polymer matrix to be used. In the case of molecular recognition compounds the accepted monovalent cations are $Na^+$, $K^+$, and $Li^+$; the preferred divalent metal cations have small ionic radius such as are $Zn^{2+}$, $Mg^{2+}$, $Mn^{2+}$, $Cu^{2+}$, $Pb^{2+}$, $Fe^{2+}$, $Ca^{2+}$; $Ti^{4+}$ and $Zr^{4+}$ are also acceptable. The most preferred surfactant for polyolefin matrix is $Zn(DBS)_2$. In the case of aromatic sulfonamides only $Zn(DBS)_2$ is preferred.

The surfactants do not alone render solubility of PANI salt complex without functionalized counter ions, but they have to be combined with the said molecular recognition compounds or sulfonamides.

The surfactant has to dissolve well enough into the molecular recognition compound or sulfonamide. Usually this is no problem for surfactants that melt at the typical processing conditions of about 200° C. Thus, $Zn(DBS)_2$, e.g., dissolves into hydroquinone. In that case, the amount of surfactant compared to the molecular recognition compound can be quite high. In contrast, if the neat surfactant does not melt at processing conditions, the limiting factor is its solubility to the molecular recognition compound. As an example it can be mentioned that NaDBS does not melt below 250° C. However, it dissolves into hydroquinone.

In summary, the anionic surfactant according to the invention can be an oligomeric or polymeric surfactant selected from the group comprising sulfonates, sulfates, phosphonates and phosphates. The surfactant can, for instance, be one of the following:

a sulfonate of the formula $[R_i—SO_3—]_n M^{n+}$, an alkylbenzenesulfonate of the formula $[R_i—C_6H_4—SO_3^-]_n M^{n+}$, a lignosulfonate, a naphthalenesulfonate of the formula $[R_i—C_{10}H_6—SO_3^-]_n M^{n+}$, an α-olefin sulfonate of the formula $[R\ CH=CH\ SO_3^-]_n M^{n+}$, a dialkyl sulfosuccinate of the formula $R_iOOCCH_2CH(SO_3Na)COOR_i$, a taurate, a sulfate of the formula $[R_i—C_{10}H_6—O—SO_3^-]_n M^{n+}$, an ethoxylated and/or sulfated alcohol of the formula $[R_i—C_{10}H_6—O—SO_3^-]_n M^{n+}$, an ethoxylated and/or sulfated alkyl phenol of the formula $[R_i—C_6H_4—(—O—CH_2CH_2—)_m—O—SO_3—]_n M^{n+}$, a sulfated acid amide and ester, a sulfated natural oil or fat, a phosphate ester or a phosphonic acid ester, wherein each $R_i$ can be independently selected from the group comprising alkyl, aryl, alkylaryl, alkylarylalkyl, alkoxy, polyalkoxy, alkylsulfinyl, alkoxyalkyl, alkylsulfonyl and alkoxycarbonyl, and $Me^{n+}$ represents a mono- di- or tetravalent metal cation.

The Substrate Phase

A fourth, optional, component of the materials of the compositions of this invention is a substrate phase. This component, which makes up about 1 to about 99.95 wt-% of the polymer blend, can comprise oligomeric, or polymeric, or pre-polymeric materials which can be transformed into a fluid (liquid or semisolid) form during processing so as to achieve the required intimate mixing with the electrically conducting polyaniline salt complex and the solvent-plasticizing substituted aromatic compound. The substrate phase can be electrically insulating or semiconductive. Useful common polymeric substrates are those belonging to the group of thermoplastic and thermoset polymers. Illustrative of thermoplastic polymers are polymers derived from the polymerization of α, β-unsaturated monomers such as polyethylene, acrylonitrile/butadiene/styrene terpolymer, polypropylene, poly(1-butene),poly(3-methyl-1-butene), poly(1-pentene), poly(4-methyl-1-pentene), poly(1-hexene), polyisobutylene, polyisoprene, polystyrene, poly(α-methylstyrene), poly(2-methylstyrene), poly(vinyl fluoride), poly(vinyl chloride), poly(tetrafluoroethylene) (Teflon), poly(vinyl alcohol), poly(vinyl methyl ether), poly(vinyl methyl ketone), poly(vinyl acetate), poly(vinyl pyrrolidone), poly(acrylic acid), poly(methyl methacrylate), polyacrylonitrile, and the like, polydienes such as poly(1,3-butadiene); polyoxides such as poly(ethylene oxide), poly (propyleneoxide), polyacetaldehyde, poly(styrene oxide) and the like; polysulfides such as poly(propylene sulfide), poly(phenylene sulfide) and the like; and polysulfones; polyesters such as poly(glycolic acid), poly(ethylene adipate), poly(ethylene succinate), poly(ethylene terephtalate) and the like; polyamides such as nylon 6, nylon 7, nylon 8, nylon 9, nylon 10, nylon 6,6, nylon 8,8, and poly(p-phenylene terephthalamide) (Kevlar) and the like; polycarbonates such as poly(methanebis(4-phenyl) carbonate) and the like.

Illustrative of thermosetting polymers are polymers derived from alkyds derived from the esterification of a polybasic acid such as phthalic acid and a polyhydric acid such as glycol; allylics such as those produced by polymerization of diallyl phthalate, diallyl isophthalate, diallyl maleate and the like; amino resins such as those produced by addition reaction between formaldehyde and such compounds as melamine, urea, sulfonamide; epoxies such as epoxy phenol novolak resins, diglycidyl ethers, diglycidylethers of bisphenol A and the like; phenolics such as resins derived from reaction of substituted or unsubstituted phenols such as cresol, and phenol with an aldehyde, such as formaldehyde and acetaldehyde; polyesters; silicones and urethanes.

Overall Compositions

In particularly preferred embodiments, the molecular recognition compound is selected from the group consisting of alkyl substituted or unsubstituted hydroquinone, resorcinol, alkyl substituted or unsubstituted catechol, alkyl gallates, dihydroxy acetophenones, bisphenol A, bisphenol F, dihydroxy benzophenone, p-hydroxy benzoic acid, m-hydroxy benzoic acid, and the surface active additive from the group consisting of $Na^+$, $Zn^{2+}$, $Mg^{2+}$ or $Cu^{2+}$ salts of alkyl benzene sulfonic acid, or alkyl $Na^+$, $Zn^{2+}$, $Mg^{2+}$ or $Cu^{2+}$ sulfates or the $Na^+$, $Zn^{2+}$, $Mg^{2+}$ or $Cu^{2+}$ salt of naphthalene sulfonic acid.

The proportions of materials of the present invention can vary widely, depending on the desired level of conductivity and the application. However, the relative amounts of the electrically conducting polyaniline salt complexes, the molecular recognition compounds and surfactant is such that during processing a homogeneous or nearly homogeneous solution and/or plasticized melt is obtained.

Typically, the compositions of this invention include electrically conductive polyaniline, substituted polyaniline, copolymers and/or mixtures thereof, doped by nonfunctionalized counter-ion (such as $H_2SO_4$ and HCl and the like) with from about 0.1 to 0.6 moles of protonic acid per substituted or unsubstituted aniline repeating unit (PhN), and most preferably directly in the process of polymerization in which case no reduction to emeraldine base form is employed.

The amount of molecular recognition compounds and surfactants may vary widely, depending on their structure, application, the desired conductivity, their molecular weights, the amount of electrically conductive polyaniline salt complex in the final composition and processing temperature. Typically the amount of molecular recognition compound varies from 10 to 90 parts by weight of the total plasticized complex and the amount of surfactant also varies from 10 to 90 parts by weight of the total plasticized complex. The upper limit of the weight fraction of the surfactant is determined so that the surfactant has to dissolve or nearly dissolve into the aromatic compound.

The amount of insulating substrates in blends with the conductive polyaniline salt complexes, molecular recognition compounds and the surfactants according to the present invention may vary widely, and is dependent on the desired level of conductivity. Hence, the content of insulating substrates ranges from at least about 1% by weight to about 99.95% by weight, preferably from about 5% by weight to about 99.9% by weight, and most preferably from about 10% by weight to about 99.5% by weight.

Optional common additional components may be included in the compositions of the present invention. Examples of such additional components include other conductive polymers, other polymers such as poly(3-alkylthiophenes) which may become conductive upon doping, graphite, metal conductors, reinforcing fibers, inert fillers (such as clays and glass), dyes, common plasticizers, and the like.

Methods of Preparation

The process for preparing the present compositions comprises preparing a protonated polyaniline polymer and admixing it with a surfactant and with a cyclic organic compound capable of forming ring-ring-interactions with the 6-membered rings of the polyaniline polymer and hydrogen bonding with said polyaniline. The admixing is preferably carried out immediately after step a.

The method of preparing and forming the compositions of this invention into compounded polymer products is not critical and can vary widely. Standard polymer processing operations can be employed, such as solid-state blending and subsequent melting or dissolving, melt-blending and solution-blending or combinations thereof. Also, common shaping operations can be used to manufacture useful articles from the present compositions, such as extrusion, thermo-forming, blow molding, injection molding, rotational molding, reactive molding, foaming and the like; common fiber spinning methods can be employed, such as melt-spinning, dry-spinning, wet-spinning, air-gap spinning, gel-spinning, flash-spinning and the like; films can be cast from the melt or solutions of the present compositions to yield dense or porous articles or membranes, or can prepared by calendering, film-blowing, and the like.

If additional non-soluble components are present (or suspended) in the compositions of the present invention, the protonated conductive polymer will form around, or be filled with, the insoluble material. If, for example, the additional components are glass fibers, the relative amounts of fibers and protonated conductive polymer remaining will cause either the polymer to be fiber-filled, the fibers to be polymer coated or impregnated, or some intermediate composite of fibers and protonated conductive polymer to be formed. In the case of systems wherein the amount of non-soluble component greatly exceeds the protonated conductive polymer remaining, individual particles or shapes of non-soluble components coated or impregnated with protonated conductive polymer will be formed. Examples of articles formed from non-soluble components and the present polymer solutions include conductive polymer coated housings for sensitive electronic equipment (microprocessors), infrared and microwave absorbing shields, flexible electrical conducting connectors, conductive bearings, brushes and semi-conducting photoconductor junctions, antistatic materials for packaging electronic components, carpet fibers, waxes for floors in computer rooms and an antistatic spray finisher for plastics, and thin, optically transparent antistatic finishes for CRT screens, aircraft, auto windows and the like.

It is also contemplated to use the present compositions as either liquid conductor or liquid semiconductor, much in the manner that liquid mercury is used in various devices. Examples of such devices include gravity switches, fluid level detecting devices or other electrical or electronic switches.

The following general methods and specific examples are presented merely to illustrate the invention and are not to be construed as limitations thereon.

Method A

Polyaniline (PANI) was prepared essentially according to the method described by Y. Cao, A. Andreatta, A. J. Heeger and P. Smith, Polymer, 30 (1989) 2305: A solution of 10.2 l of aniline (Merck), 6.0 l of 93% $H_2SO_4$ and 110 l distilled water was prepared in an polymerization reactor. The reactor was placed in a cooling bath maintained at 0° C. Polymerization was effected by addition of an oxidant solution consisting of 31.09 kg of $(NH_4)_2S_2O_8$ and 67.65 l of distilled water. Once all oxidant had been added (over a period of time of 4 hr) the precipitated polymer powder was recovered by centrifuging and washed with distilled water until the pH of the washing liquid was 6–7. Subsequently, the polymer was washed twice with 200 liters of 94% ethanol. Finally, the polymer was dried for 8 h at 60° C. in dynamic vacuum.

Method B

Electrically conducting polyaniline salt complex such as $PANI(H_2SO_4)$ or PANI(HCl), organic compound and surfactant were mixed in an miniature single screw mixer for 5 minutes by using rotation speed of 100–300 rpm. The weight fractions of components are given in the Examples. The temperature of the mixer was maintained constant typically between 160° C. and 230° C., depending on the melting point of the substituted aromatic compound. The most used temperature in the preliminary screening work was 190° C. After 5 minutes of mixing a sample was taken and pressed between two microscope glass slides and heated to the same temperature as where mixing was performed.

The solubility of the electrically conducting polyaniline complex in the organic compound/surfactant was investigated using a polarizing light optical microscope. If a homogeneous, one-phase sample, free or nearly free of any remaining solid particles was observed, the organic compound/surfactant was classified as a solvent for the polyaniline salt complex at the temperature of mixing. In some cases, a birefringent structure is observed showing a crystalline structure without any observable dispersion. If transparent dispersed particles with softened edges were observed, the organic compound/surfactant was designated as a moderate solvent at the temperature of mixing. If a clear dispersion of solid particles with sharp edges was observed, the substituted organic compound/surfactant was classified as a non-solvent for the conductive polyaniline complex at the temperature of mixing. Said combination will be considered a poor solvent if only some swelling can be observed.

Within the scope of the present invention, the cyclic organic compound and the surfactant are considered capable of dissolving the polyaniline polymer if the solubility thereof, as determined above, is "very good", "good" or "moderate".

Method C

The electrically conducting plasticized complex PANI (H$_2$SO$_4$)/organic compound/surfactant, to be specified in the Examples, is prepared first by Method B. Said electrically conducting plasticized polyaniline complex and polymeric matrix is mixed (at the weight fraction to be specified in the examples) by using a miniature corotating twin screw extruder at constant temperature, defined specifically in the examples. The extruder is used in batch mode by using mixing time of 5 minutes at a rotation speed of 200 rpm. The matrices used were high impact polystyrene (HIPS) (SB 735 by Neste Oy) and high density polyethylene NCPE 3415 (Neste Oy). The temperatures used are 175° C. for HIPS and 180° C. for HDPE. The electrical conductivity was measured using the conventional 4-probe method.

Method D

Zinc dodecyl benzene sulfonate was prepared by mixing 2.4 kg ZnO (supplied by Kuusakoski Oy, Finland) in 9.0 l ethanol of technical purity grade by carefully mixing in a Burger mixer. Thereafter 19.2 kg of DBSA (Sulfosoft) is added and carefully mixed. To ensure the neutrality, 864 g of CaCO$_3$ is added. The temperature is gradually raised to approximately 150° C. while continuously stirring. The temperature is kept at 150° C. until all the ethanol is distilled (the total time 8 h). The drying was done at 60° C. in vacuum.

Method E

Calcium dodecyl benzene sulfonate is prepared by mixing 8.6 g CaO in 400 ml ethanol of technical purity grade (Solventol) by carefully mixing in a laboratory mixer. Thereafter 100 g of DBSA (Sulfosoft) is added and carefully mixed. The mixture is heated at 60° C. while mixing for 1 h. The drying was done at 60° C. in vacuum.

Method F

In the following screening, the electrical conductivity will be classified into the following groups:

|  |  |  |  |  |
|---|---|---|---|---|
|  |  | σ | > | $10^{-3}$ S/cm | very good |
| $10^{-3}$ S/cm | > | σ | > | $5 \cdot 10^{-5}$ S/cm | good |
| $5 \cdot 10^{-5}$ S/cm | > | σ | > | $10^{-6}$ S/cm | moderate |
| $10^{-6}$ S/cm | > | σ | > | $10^{-9}$ S/cm | slight |
| $10^{-9}$ S/cm | > | σ |  |  | no |

Comparative Example 1 (Outside of the Invention)

7.5 parts by weight PANI(H$_2$SO$_4$) was mixed according to method B with 50 parts by weight of an organic compound and 42.5 parts by weight of a surfactant at a temperature of 190° C. Zn(DBS)$_2$ was prepared according to method D. The other additives were acquired from Fluka or Aldrich.

In all cases a clear dispersion of solid, unswollen PANI (H$_2$SO$_4$) particles was observed and PANI(H$_2$SO$_4$) was found to be completely insoluble in the combinations (Table 1).

TABLE 1

Solubilities of admixtures of PANI(H$_2$SO$_4$), organic compounds and surfactants

| PANI-(H$_2$SO$_4$) |  | Organic compound |  | Surfactant |  |  |
|---|---|---|---|---|---|---|
| wt-% | type | wt-% | type | wt-% | Solubility |
| 7.5 | 1-Decanol | 50 | Zn(DBS)$_2$ | 42.5 | No |
| 7.5 | 1,8-Octanediol | 50 | Zn(DBS)$_2$ | 42.5 | No |
| 7.5 | Lauryl acid | 50 | Zn(DBS)$_2$ | 42.5 | No |

TABLE 1-continued

Solubilities of admixtures of PANI(H$_2$SO$_4$), organic compounds and surfactants

| PANI-(H$_2$SO$_4$) | Organic compound |  | Surfactant |  |  |
|---|---|---|---|---|---|
| wt-% | type | wt-% | type | wt-% | Solubility |
| 7.5 | Dodecyl amine | 50 | Zn(DBS)$_2$ | 42.5 | No |
| 7.5 | 3-pentadecyl-phenol | 50 | Zn(DBS)$_2$ | 42.5 | No |
| 7.5 | 3-pentadecyl-phenol | 50 | NaDBS | 42.5 | No |
| 7.5 | Benzoic acid | 50 | Zn(DBS)$_2$ | 42.5 | No |
| 7.5 | Benzamide | 50 | Zn(DBS)$_2$ | 42.5 | No |
| 7.5 | Terephthal dialdehyde | 50 | Zn(DBS)$_2$ | 42.5 | No |

Comparative Example 2 (Outside of the Invention)

A polyaniline complex comprising of 7.5 parts by weight PANI(H$_2$SO$_4$), 50 parts by weight 3-Pentadecyl phenol and 42.5 prts by weight Zn(DBS)$_2$ was prepared according to Method B. 30 parts by weight of said complex was mixed with 70 parts by weight PS SB 735 according to Method C and found non-conducting.

Comparative Examples 1 and 2 above show that nonsolvent organic compound and surfactant combinations do not lead to reduced percolation thresholds for the onset of conductivity in blends with the insulating polystyrene.

Comparative Example 3 (Outside of the Invention)

PANI(H$_2$SO$_4$) was prepared according to Method A. PANI(HCl) was prepared in similar way with the exception that H$_2$SO$_4$ was replaced by HCl. 7.5 wt-% PANI(H$_2$SO$_4$) or 7.5 wt-% PANI(HCl), respectively, were mixed with 92.5 wt-% of a molecular recognition compound according to Method B. The results are shown in Table 2. Two temperatures were used: 190° C. and 230° C. 230° C. is regarded here as an example of high temperature above which degradation phenomena are expected to increase. All organic compounds are acquired from Aldrich, Fluka, Merck, Nipa Laboratories Ltd, or Pfaltz & Bauer.

TABLE 2

Solubility testing of mixtures containing 7.5 wt-% of a PANI complex and 92.5 wt-% of a molecular recognition compound at 190° C. and 230° C.

| PANI Complex | Molecular recognition compound | Solubility at 190° C. | Solubility at 230° C. |
|---|---|---|---|
| PANI(H$_2$SO$_4$) | Hydroquinone | Poor solvent | Poor solvent |
| PANI(H$_2$SO$_4$) | Trimethyl hydroquinone | Poor solvent | Poor solvent |
| PANI(H$_2$SO$_4$) | 4-Hydroxypropiophenone | Poor solvent | Poor solvent |
| PANI(H$_2$SO$_4$) | Hydroquinone monomethyl ether | Poor solvent | Poor solvent |
| PANI(H$_2$SO$_4$) | 4-Hydroxy benzoic acid | Poor solvent | Poor solvent |
| PANI(H$_2$SO$_4$) | Resorcinol | Poor solvent | Good solvent |
| PANI(H$_2$SO$_4$) | 3-Hydroxy benzoic acid | Poor solvent | Poor solvent |
| PANI(H$_2$SO$_4$) | Catechol | Poor solvent | Poor solvent |
| PANI(H$_2$SO$_4$) | 2,4-Dihydroxy acetophenone | Poor solvent | Poor solvent |
| PANI(H$_2$SO$_4$) | Propyl 3,4,5-Trihydroxy benzoate | Poor solvent | Poor solvent |
| PANI(H$_2$SO$_4$) | Bisphenol F | Poor solvent | Poor solvent |
| PANI(H$_2$SO$_4$) | Resorcinol monobenzoate | Poor solvent | Poor solvent |
| PANI(H$_2$SO$_4$) | 2,4-Dihydroxy benzophenone | Poor solvent | Poor solvent |

TABLE 2-continued

Solubility testing of mixtures containing 7.5 wt-% of a PANI complex and 92.5 wt-% of a molecular recognition compound at 190° C. and 230° C.

| PANI Complex | Molecular recognition compound | Solubility at 190° C. | Solubility at 230° C. |
|---|---|---|---|
| PANI(H$_2$SO$_4$) | Phenothiazine | Poor solvent | Poor solvent |
| PANI(HCl) | Hydroquinone | Poor solvent | Poor solvent |

One can conclude that at 190° C. the molecular recognition compounds do not dissolve PANI(H$_2$SO$_4$). At 230° C. the solubility seems to increase. However, the solubility is still poor, except in the special case of resorcinol. The solvating properties of resorcinol seem to be unique and are perhaps due to the OH-groups in the meta position, whose distances match those of the PANI-complex. Note that PANI(H$_2$SO$_4$) does not dissolve even into the substituted resorcinols 2,4-dihydroxy benzophenone or 2,4-dihydroxy acetophenone.

Comparative Example 4 (Outside of the Invention)

PANI(H$_2$SO$_4$) was prepared according to Method A. 7.5 wt-% PANI(H$_2$SO$_4$) are mixed with 92.5 wt-% Zn(DBS)$_2$ which was prepared according to Method D. The mixing takes place at 190° C., 230° C., 250° C, 260° C. or 270° C.

Example 5

7.5 parts by weight PANI(H$_2$SO$_4$) was mixed by Method B at 190° C. with 92.5 parts by weight trimethyl hydroquinone (Fluka)

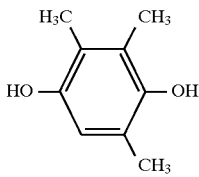

which is a molecular recognition compound.

It is observed that PANI(H$_2$SO$_4$) is not soluble to trimethyl hydroquinone at 190° C. 7.5 parts by weight PANI(H$_2$SO$_4$) was mixed with 92.5 parts by weight Zn(DBS)$_2$ prepared by method D. No signs of solubility are observed in this case. But when 7.5 parts by weight PANI(H$_2$SO$_4$) was mixed with a combination of trimethyl hydroquinone and Zn(DBS)$_2$ a solubilized complex is observed as is shown in Table 3.

TABLE 3

Solubilities of PANI(H$_2$SO$_4$)/Trimethyl hydroquinone/Zn(DBS$_2$)-mixtures

| PANI(H$_2$SO$_4$), wt-% | Trimethyl hydroquinone wt-% | Zn(DBS$_2$), wt-% | Solubility | σ(S/cm) |
|---|---|---|---|---|
| 7.5 | 92.5 | 0 | No | No |
| 7.5 | 90 | 2.5 | Poor | Slight |
| 7.5 | 2.5 | 10 | Good | Good |
| 7.5 | 75.5 | 17.5 | Moderate | Slight |
| 7.5 | 62.5 | 30 | Good | Good |
| 7.5 | 50 | 42.5 | Good | Good |
| 7.5 | 32.5 | 60 | Good | Good |

TABLE 3-continued

Solubilities of PANI(H$_2$SO$_4$)/Trimethyl hydroquinone/Zn(DBS$_2$)-mixtures

| PANI(H$_2$SO$_4$), wt-% | Trimethyl hydroquinone wt-% | Zn(DBS$_2$), wt-% | Solubility | σ(S/cm) |
|---|---|---|---|---|
| 7.5 | 17.5 | 75 | No | Moderate |
| 7.5 | 2.5 | 90 | No | Slight |
| 7.5 | 0 | 92.5 | No | No |

Comparative Example 6

7.5 parts by weight PANI(H$_2$SO$_4$) was observed to be insoluble to 92.5 parts by weight hydroquinone (Fluka)

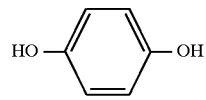

according to Method B at 190° C.

7.5 parts by weight PANI(H$_2$SO$_4$) was observed to be soluble with 50 parts by weight hydroquinone and 42.5 parts by weight Zn(DBS)$_2$ according to Methods B and D at 190° C.

7.5 parts by weight PANI(H$_2$SO$_4$) was observed to be only moderately soluble with 50 parts by weight hydroquinone monomethyl ether (Merck)

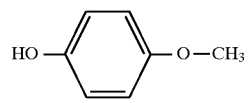

and 42.5 parts by weight Zn(DBS)$_2$ according to Methods B and D at 190° C.

7.5 parts by weight PANI(H$_2$SO$_4$) was observed to be insoluble with 50 parts by weight 3-pentadecylphenol (Aldrich)

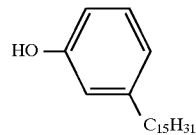

and 42.5 parts by weight Zn(DBS)$_2$ according to Methods B and D at 190° C.

This example clearly demonstrates that a hydroxyl group, which is known to have hydrogen bonding ability, is a favourable substitution. Replacing one of the hydroxyl groups in the molecular recognition compound by a methoxy group changes the compound from being an excellent solvent in combination with surfactant to only moderate solvent; and further, if even the ether oxygen is removed, the substituted aromatic compound is a nonsolvent; due to the insufficient hydrogen bonding capability.

Example 7

7.5 parts by weight PANI(H$_2$SO$_4$) was mixed with 50 parts by weight propyl-3,4,5-trihydroxybenzoate (propyl gallate, PG; Merck)

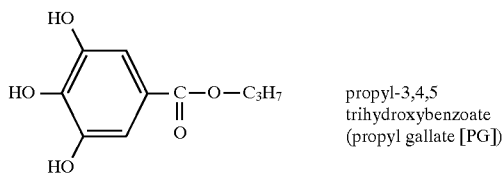

propyl-3,4,5 trihydroxybenzoate (propyl gallate [PG])

and 42.5 parts by weight Zn(DBS)$_2$ (prepared by Method D) at 190° C. according to Method B and found to be a moderate solvent.

Comparative Example 8 (Outside of the Invention)

7.5 parts by weight PANI(H$_2$SO$_4$) was mixed with 50 parts by weight alkyl dimethylol phenol (SP 1045, Schenectady) and 42.5 parts by weight Zn(DBS)$_2$ (prepared by the Method D) at 190° C. according to Method B and found to be a poor solvent.

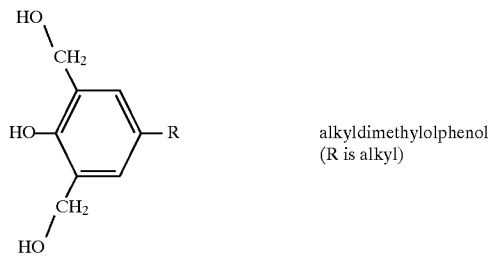

alkyldimethylolphenol (R is alkyl)

This example demonstrates that the position of the OH-groups relative to the phenyl ring is critical.

Example 9

7.5 parts by weight PANI(H$_2$SO$_4$) was mixed by Method B at 190° C. with 92.5 parts by weight 2,4-dihydroxy benzophenone which is a molecular recognition compound.

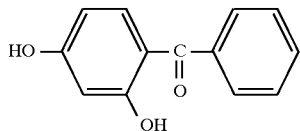

It is observed that PANI(H$_2$SO$_4$) is only poorly soluble to 2,4-dihydroxy benzophenone. 7.5 parts by weight PANI (H$_2$SO$_4$) was mixed with 92.5 parts by weight Zn(DBS)$_2$ prepared by the Method D and poor solubility is observed. But when 7.5 parts by weight PANI(H$_2$SO$_4$) was mixed with 43.8 parts by weight 2,4-dihydroxy benzophenone and 48.6 parts by weight Zn(DBS)$_2$ a well solubilized-complex is observed.

Summarizing, one can conclude that molecular recognition compounds alone do not render PANI(H$_2$SO$_4$) soluble at acceptable temperatures below approximately 200° C. The same is true for Zn(DBS)$_2$ as was shown in Example 4. However, surprisingly, mixtures of them are capable of solubilizing PANI(H$_2$SO$_4$) at temperatures of approximately 200° C. or below.

Example 10

7.5 weight parts of PANI(H$_2$SO$_4$) was mixed with 92.5 weight parts of resorcinol (Fluka)

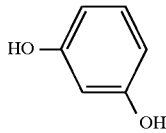

according to the method B at 190° C.

A dispersion-like morphology was observed indicating poor solubility. However, the conductivity was $5.9 \cdot 10^{-5}$ S/cm which shows that some signs of solubility may actually exist. A new mixture was prepared by mixing 7.5 weight parts of PANI(H$_2$SO$_4$) with 92.5 weight parts of sodium dodecyl benzene sulfonate (NaDBS) (Aldrich) according to the method B. It was observed that PANI(H$_2$SO$_4$) is not soluble NaDBS. The mixture was non-conducting. The experiment was repeated by using a mixtures of resorcinol and NaDBS as shown in the Table 4:

TABLE 4

| Solubilities of PANI(H$_2$SO$_4$)/Resorcinol/NaDBS-mixtures | | | | |
|---|---|---|---|---|
| PANI(H$_2$SO$_4$), wt-% | Resorcinol wt-% | NaDBS, wt-% | Solubility | σ(S/cm) |
| 7.5 | 92.5 | 0 | No | $5.9 \cdot 10^{-5}$ |
| 7.5 | 67.5 | 25 | Good | $2.9 \cdot 10^{-5}$ |
| 7.5 | 47.1 | 45.4 | Good | $7.9 \cdot 10^{-4}$ |
| 7.5 | 0 | 92.5 | No | $10^{-10}$ |

Therefore it can be concluded that resorcinol or NaDBS alone do not yield a solubilized complex at 190° C. This example teaches that NaDBS can be used as an alternative to Zn(DBS)$_2$. It is specially noteworthy to notice that Zn(DBS)$_2$ softens at elevated temperatures while neat NaDBS does not melt.

Example 11

7.5 parts by weight PANI(H$_2$SO$_4$) was mixed with 92.5 parts by weight catechol. The method B was used at 190° C. It was observed that PANI(H$_2$SO$_4$) is only poorly soluble to catechol. Ca(DBS)$_2$ was prepared by Method E. 7.5 parts by weight PANI(H$_2$SO$_4$) was mixed with 92.5 parts by weight Ca(DBS)$_2$. The solubility is poor in this case. But when 7.5 parts by weight PANI(H$_2$SO$_4$) was mixed with a combination of 50 parts by weight catechol and 42.5 parts by weight Ca(DBS)$_2$ a well solubilized complex was observed having a conducivity of $1.2 \cdot 10^{-4}$ S/cm.

Example 12

7.5 parts by weight of PANI(H$_2$SO$_4$) was mixed with 92.5 parts by weight hydroquinone (Fluka) and a dispersion-like morphology was observed. The experiment was repeated by using 7.5 parts by weight of PANI(H$_2$SO$_4$) with a combination of hydroquinone and different surfactants as is shown in Table 5.

TABLE 5

Solubilities of mixtures of PANI(H$_2$SO$_4$) and hydroquinone with various surfactants

| T [°C.] | PANI-(H$_2$SO$_4$) [wt-%] | Molecular recognition compound [wt-%] | type | Surfactant [wt-%] | type | Solubility | σ(S/cm) |
|---|---|---|---|---|---|---|---|
| 190 | 7.5 | 50 | Hydroquinone | 42.5 | Zn(DBS)$_2$ | Moderate | Very good |
| 190 | 7.5 | 80 | Hydroquinone | 12.5 | NaDBS | Good | Very good |
| 200 | 7.5 | 85 | Hydroquinone | 7.5 | 4-Vinylbenzene sulfonic acid Na-salt | Good | Very good |
| 200 | 7.5 | 50 | Hydroquinone | 42.5 | 2-Naphthalene sulfonic acid Na-salt | Moderate | Good |
| 200 | 7.5 | 50 | Hydroquinone | 42.5 | 1-Butane sulfonic acid Na-salt | Moderate | Very good |
| 215 | 7.5 | 85 | Hydroquinone | 7.5 | Na dioctyl sulfosuccinate[3] | Good | Very good |
| 210 | 7.5 | 85 | Hydroquinone | 7.5 | K$_2$S$_2$O$_7$ | Moderate | Good |
| 205 | 6 | 60 | Hydroquinone | 34 | Neopentyl (diallyl)oxy tri(dodecylbenzene sulfonyl) titanate[1] | Good | |
| 220 | 6 | 60 | Hydroquinone | 34 | Neopentyl (diallyl)oxy tri(dioctylphosphato) titanate[2] | Moderate | |

[1]CAPS L 09/K (Kenrich)
[2]CAPS L 12/L (Kenrich)
[3]PELEX OTC (KAO Corporation)

Example 13

7.5 parts by weight of PANI(H$_2$SO$_4$) was mixed at 190° C. with 92.5 parts by weight resorcinol (Fluka) and a dispersion-like morphology was observed.

The experiment was repeated by using 7.5 parts by weight of PANI(H$_2$SO$_4$) with a combination of resorcinol and different surfactants as shown in Table 6.

TABLE 6

Solubilities of mixtures of PANI(H$_2$SO$_4$) and resorcinol with various surfactants

| T [°C.] | PANI-(H$_2$SO$_4$) [wt-%] | Molecular recognition compound [wt-%] | type | Surfactant [wt-%] | type | Solubility | σ(S/cm) |
|---|---|---|---|---|---|---|---|
| 190 | 7.5 | 50 | Resorcinol | 42.5 | Zn(DBS)$_2$ | Good | Very good |
| 190 | 7.5 | 50 | Resorcinol | 42.5 | NaDBS | Good | Good |
| 190 | 7.5 | 50 | Resorcinol | 42.5 | 4-Vinylbenzene sulfonic acid Na-salt | Good | |
| 190 | 7.5 | 50 | Resorcinol | 42.5 | 1,3-Benzene disulfonic acid di Na-salt | Good | Good |
| 190 | 7.5 | 50 | Resorcinol | 42.5 | 2-Naphthalene sulfonic acid Na-salt | Good | Good |
| 190 | 7.5 | 50 | Resorcinol | 42.5 | 1-Butane sulfonic acid Na-salt | Good | Very good |
| 210 | 6 | 60 | Resorcinol | 34 | Neopentyl (diallyl)oxy tri(dodecylben- | Good | |

TABLE 6-continued

Solubilities of mixtures of PANI(H$_2$SO$_4$) and resorcinol with various surfactants

| T [°C.] | PANI-(H$_2$SO$_4$) [wt-%] | Molecular recognition compound [wt-%] | type | Surfactant [wt-%] | type | Solubility | σ(S/cm) |
|---|---|---|---|---|---|---|---|
| 210 | 6 | 60 | Resorcinol | 34 | zene sulfonyl) titanate[1] Neopentyl (diallyl)oxy tri(dioctylphosphato) titanate[2] | Moderate | |
| 210 | 7 | 74.4 | Resorcinol | 18.6 | Na$_2$SO$_4$ | Good | Very good |
| 210 | 7 | 74.4 | Resorcinol | 18.6 | CaSO$_4$ | Good | Very good |
| 210 | 7 | 74.4 | Resorcinol | 18.6 | K$_2$S$_2$O$_7$ | Good | Moder. |

1: CAPS L 09/K (Kenrich)
2: CAPS L 12/L (Kenrich)

Crystalline solubilized structures can be observed in some cases: 7.5% PANI (H$_2$SO$_4$)/50% resorcinol/42.5% Zn(DBS)$_2$ is nearly homogeneous showing macroscopic crystalline structure. One can also conclude that there are even some inorganic metal salts that seem to work in combination with molecular recognition compounds.

Example 15 (Outside the Invention)

The previous example was repeated and the results are indicated in Table 7.

TABLE 7

Solubilities of mixtures of PANI(H$_2$SO$_4$) and resorcinol with various surfactants (comparison)

| PANI-(H2SO$_4$) [wt-%] | Molecular recognition compound [wt-%] | type | Surfactant [wt-%] | type | Solubility | σ(S/cm) |
|---|---|---|---|---|---|---|
| 7.5 | 50 | Resorcinol | 42.5 | Zn-stearate | No | No |

TABLE 7-continued

Solubilities of mixtures of PANI(H$_2$SO$_4$) and resorcinol with various surfactants (comparison)

| PANI-(H2SO$_4$) [wt-%] | Molecular recognition compound [wt-%] | type | Surfactant [wt-%] | type | Solubility | σ(S/cm) |
|---|---|---|---|---|---|---|
| 7.5 | 50 | Resorcinol | 42.5 | 4-Hydroxy benzoic acid Na-salt | No | No |

This example shows that carboxylate type anionic surfactants do not render low dissolution temperature in combination with molecular recognition solvents.

Example 16

Example 15 was repeated with PANI(H$_2$SO$_4$) and various combinations of molecular recognition compounds and surfactants by using method B at 190° C. The results are shown in Table 8:

TABLE 8

Solubilities of mixtures of PANI(H$_2$SO$_4$) and some molecular recognition compound with various surfactants

| PANI(H2SO$_4$) [wt-%] | Molecular recognition compound [wt-%] | type | Surfactant [wt-%] | type | Solubility | σ(S/cm) |
|---|---|---|---|---|---|---|
| 7.5 | 50 | Catechol | 42.5 | Zn(DBS)$_2$ | Good | Good |
| 7.5 | 50 | Catechol | 42.5 | Ca(DBS)$_2$ | Good | Moderate |
| 7.5 | 50 | Catechol | 42.5 | NaDBS | Good | Very good |
| 7.5 | 50 | 2,4-Dihydroxy acetophenone | 42.5 | Zn(DBS)$_2$ | Moderate | |
| 7.5 | 50 | 2,4-dihydroxy acetophenone | 42.5 | Ca(DBS)$_2$ | Moderate | Slight |

Example 17

PANI($H_2SO_4$) and combinations of molecular recognition compounds and surfactants were mixed by using method B at 190° C., unless otherwise stated. The results are shown in Table 9:

TABLE 9

Properties of mixtures of PANI($H_2SO_4$) and molecular recognition compound with Zn(DBS)$_2$

| PANI(H2SO$_4$) | Molecular recognition compound | | Surfactant | | | |
|---|---|---|---|---|---|---|
| [wt-%] | [wt-%] | type | [wt-%] | type | Solubility | σ(S/cm) |
| 7.5 | 50 | Hydroquinone | 42.5 | Zn(DBS)$_2$ | Good | Moderate |
| 7.5 | 40 | tert-Bu hydroquinone | 52.5 | Zn(DBS)$_2$ | Good | Good |
| 7.5 | 80 | Phenyl hydroquinone 225° C. | 12.5 | Zn(DBS)$_2$ | Good | |
| 7.5 | 50 | Resorcinol | 42.5 | Zn(DBS)$_2$ | Good | Very good |
| 7.5 | 50 | Catechol | 42.5 | Zn(DBS)$_2$ | Good | Good |
| 7.5 | 80 | tert-Bu catechol 225° C. | 12.5 | Zn(DBS)$_2$ | Good | |
| 7.5 | 50 | Bisphenol A | 42.5 | Zn(DBS)$_2$ | Moderate | Slight |
| 7.5 | 50 | Bisphenol F | 42.5 | Zn(DBS)$_2$ | Moderate | Good |
| 7.5 | 50 | 4-Methoxy phenol | 42.5 | Zn(DBS)$_2$ | Moderate | Moderate |
| 7.5 | 50 | Propyl gallate | 42.5 | Zn(DBS)$_2$ | Moderate | Moderate |
| 7.5 | 50 | 4-Hydroxy benzoic acid, 220° C. | 42.5 | Zn(DBS)$_2$ | Good | |
| 7.5 | 50 | 4-Hydroxy benzoic acid, 200° C. | 42.5 | Zn(DBS)$_2$ | Moderate | Good |
| 7.5 | 80 | 2-Phenyl phenol 225° C. | 12.5 | Zn(DBS)$_2$ | Moderate | |
| 7.5 | 50 | 4-Hydroxy propiophenone | 42.5 | Zn(DBS)$_2$ | Good | Slight |
| 7.5 | 50 | 2,4-Dihydroxy acetophenone | 42.5 | Zn(DBS)$_2$ | Good | Very good |
| 7.5 | 50 | 2,4-Dihydroxy benzophenone | 42.5 | Zn(DBS)$_2$ | Good | |

It can be concluded that the said combination of molecular recognition compound and Zn(DBS)$_2$ renders PANI ($H_2SO_4$) soluble.

Example 18 (Outside the Invention)

Example 18 was repeated with PANI($H_2SO_4$) and combinations of organic compounds and Zn(DBS)$_2$ by using method B at 190 ° C., as shown in Table 10:

TABLE 10

Properties of mixtures of PANI($H_2SO_4$) and organic compounds with Zn(DBS)$_2$, comparison)

| PANI(H$_2$SO$_4$) | Organic compound | | Surfactant | | | |
|---|---|---|---|---|---|---|
| [wt-%] | [wt-%] | type | [wt-%] | type | Solubility | σ(S/cm) |
| 7.5 | 50 | 4-Hydroxy-3-methoxy benzaldehyde | 42.5 | Zn(DBS)$_2$ | Poor | Slight |
| 7.5 | 50 | 4-Acetoxy benzoic acid | 42.5 | Zn(DBS)$_2$ | No | Slight |
| 7.5 | 50 | Lowilite 55[1] | 42.5 | Zn(DBS)$_2$ | No | No |
| 7.5 | 50 | Lowinox 44B25[2] | 42.5 | Zn(DBS)$_2$ | Poor | No |
| 7.5 | 50 | Lowinox AH25[3] | 42.5 | Zn(DBS)$_2$ | Poor | Slight |
| 7.5 | 50 | Lowinox 44S46[4] | 42.5 | Zn(DBS)$_2$ | No | No |
| 7.5 | 50 | Lowinox 221B46[5] | 42.5 | Zn(DBS)$_2$ | No | Slight |
| 7.5 | 50 | 3,3-Di-t-butyl-4,4-bisphenol | 42.5 | Zn(DBS)$_2$ | Poor | Slight |

[1]2-(2'-Hydroxy-5'-methyl-phenyl)-benzotriazole
[2]4,4'-Butylidene-bis-(2-tert-butyl-5-methyl phenol)
[3]2,5-di-tert-amyl hydroquinone
[4]4,4'-Thio-bis-(2-tert-butyl-5-methyl phenol)
[5]2,2'-Isobutylidene-bis-(4,6-dimethyl phenol)

1. 2-(2'-Hydroxy-5'-methyl-phenyl)-benzotriazole
2. 4,4'-Butylidene-bis-(2-tert-butyl-5-methyl phenol)
3. 2,5-di-tert-amyl hydroquinone
4. 4,4'-Thio-bis-(2-tert-butyl-5-methyl phenol)
5. 2,2'-Iobutylidene-bis-(4,6-dimethyl phenol)

One can conclude that solubility is reduced if the hydrogen bonding ability of the organic compound is not sufficient as in the case of aldehydes or there is a bulky substitute hindering the secondary interactions or if an internal hydrogen bond is formed within the organic compound. Therefore bulky substitutions such as branched alkyl chains are not preferred. One can, however, observe that at least some of the compounds with bulky side groups, such as tertiary butyl catechol and phenyl hydroquinone, are capable of solubilizing PANI($H_2SO_4$) in combination with surfactants, if the weight fractions and mixing temperatures are optimized.

In order to solubilize PANI($H_2SO_4$), molecular recognition compounds alone are not sufficient but have to be used in combination with surfactants.

Example 19

PANI(HCl) was prepared as described in Method A by replacing $H_2SO_4$ with HCl. Method B was used to prepare the mixtures indicated in Table 11.

TABLE 11

Properties of mixtures of PANI(HCl) and organic compounds with $Zn(DBS)_2$

| PANI(HCl) | Organic compound | | Surfactant | | | |
|---|---|---|---|---|---|---|
| [wt-%] | [wt-%] | type | [wt-%] | type | Solubility | σ(S/cm) |
| 7.5 | 50 | Hydroquinone | 42.5 | $Zn(DBS)_2$ | Good | Good |
| 7.5 | 50 | Methyl hydroquinone | 42.5 | $Zn(DBS)_2$ | Good | Slight |
| 7.5 | 50 | t-Bu hydroquinone | 42.5 | $Zn(DBS)_2$ | Good | Slight |
| 7.5 | 50 | Catechol | 42.5 | $Zn(DBS)_2$ | Good | No |
| 7.5 | 50 | Bisphenol-A | 42.5 | $Zn(DBS)_2$ | Good | No |
| 7.5 | 50 | 2,4-Dihydroxy aceto phenone | 42.5 | $Zn(DBS)_2$ | Good | Very good |

Example 20

The following mixtures were prepared according to Methods B and D, varying the mixing temperature.

a) 7.5 parts by weight PANI($H_2SO_4$) with different combinations of hydroquinone and $Zn(DBS)_2$.

b) 7.5 parts by weight PANI($H_2SO_4$) with different combinations of hydroquinone and NaDBS.

Figure 2A:
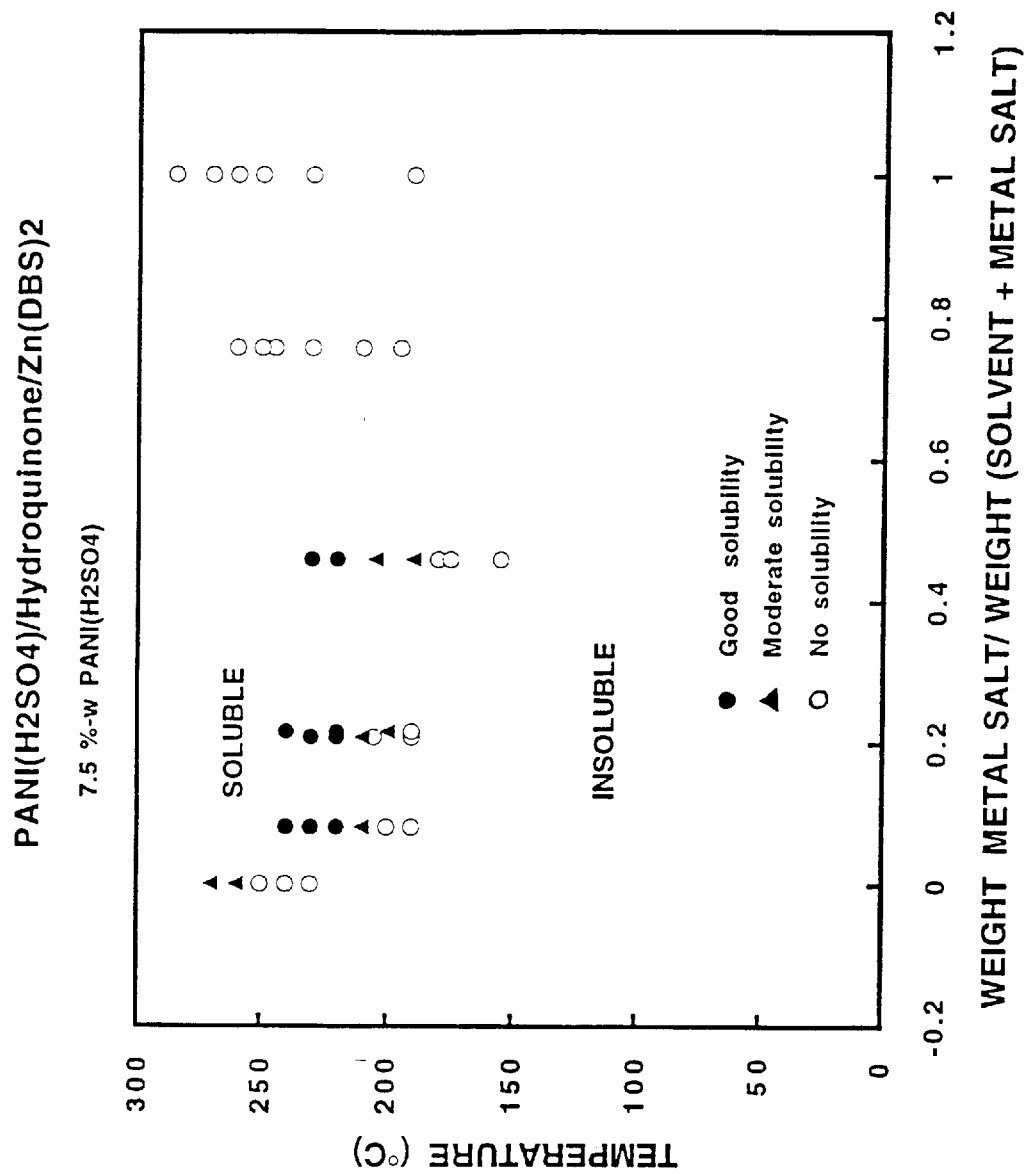
FIG. 2a shows the solubility phase diagram for 7.5% PANI($H_2SO_4$) in combination with hydroquinone and Zn(DBS)$_2$
Figure 2B:
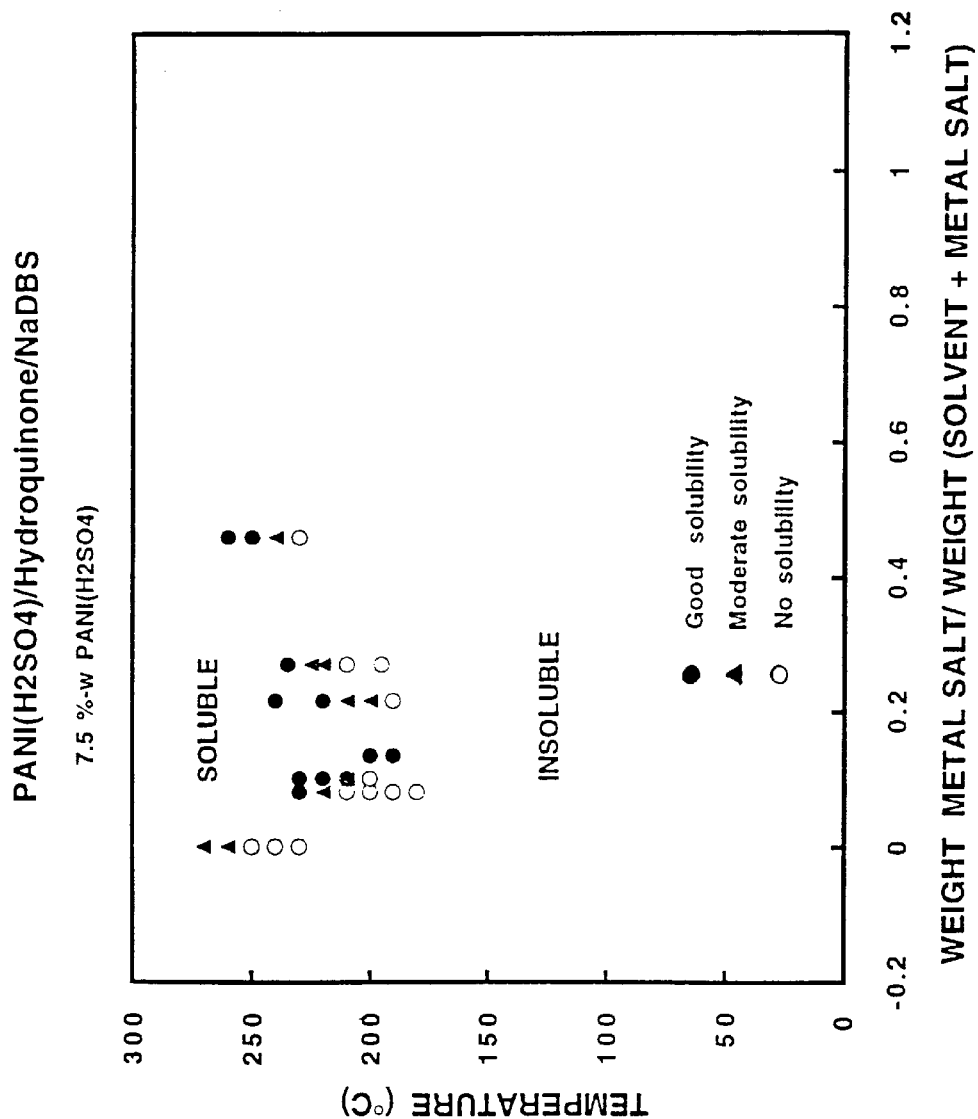
FIG. 2b shows the solubility phase diagram for 7.5% PANI($H_2SO_4$) in combination with hydroquinone and NaDBS.

The phase diagrams for solubility are shown in FIGS. 2. The figures illustrate the observation that there is an optimum concentration of surfactant relative to the molecular recognition compound, depending on the actual selected molecular recognition compound and surfactant.

Example 21

According to method B, 7.5 parts by weight of PANI ($H_2SO_4$) was mixed at 215° C. with 92.5 parts by weight sodium naphthalene sulfonate formaldehyde condensate DEMOL T (KAO Corporation)

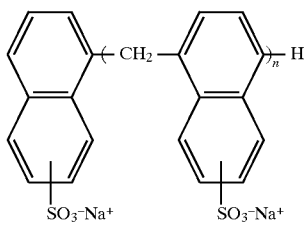

(n is generally 4–5). No solubility was observed. However, when 7.5 parts by weight of PANI($H_2SO_4$), 70 parts by weight of hydroquinone and 22.5 parts by weight of DEMOL T are mixed at 215° C. according to method B a good solubilization is observed with very good conductivity.

Example 22

According to method B, 7.5 parts by weight of PANI ($H_2SO_4$) was mixed with 92.5 parts by weight of sodium alkylnaphthalene sulfonate formaldehyde condensate DEMOL SNB (KAO Corporation) at 215° C.

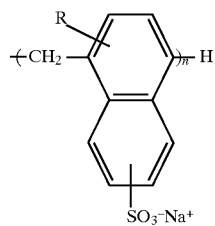

(n and alkyl R are not known). No solubility was observed. However, when 7.5 parts by weight of PANI($H_2SO_4$), 70 parts by weight of hydroquinone and 22.5 parts by weight of DEMOL SNB are mixed at 215° C. according to method B a good solubilization is observed with very good conductivity.

Examples 21 and 22 teach that the anionic surfactant can also be a polymer.

Example 23

A plasticized electrically conducting complex was prepared by Method B using the weight fraction of additives shown in Table 12. 30 parts by weight of said complex is mixed with 70 parts by weight of HIPS (Neste SB 735) at a temperature of 175° C. by using Method C.

TABLE 12

PANI-salt complex/HIPS-Blends: Conductivities by using P/A$_1$/
A$_2$ mixtures with varying composition

| P | A$_1$ | | A$_2$ | | PANI salt complex | HIPS | σ(S/cm) of PANI/-HIPS blend |
|---|---|---|---|---|---|---|---|
| (wt-%) | (wt-%) | type | (wt-%) | type | (wt-%) | (wt-%) | |
| 7.5 | 50 | Trimethyl HQ | 42.5 | Zn(DBS)$_2$ | 30 | 70 | 3.8 · 10$^{-4}$ |
| 7.5 | 32.5 | Trimethyl HQ | 60 | Zn(DBS)$_2$ | 30 | 70 | 1.5 · 10$^{-7}$ |
| 7.5 | 17.5 | Trimethyl HQ | 75 | Zn(DBS)$_2$ | 30 | 70 | <1 · 10$^{-9}$ |

In the Table, P denotes PANI(H$_2$SO$_4$), and TrimethylHQ denotes trimethyl hydroquinone.

Example 24

A plasticized electrically conducting salt complex was prepared by Method B at 190° C. from 7.5 parts by weight of PANI(H$_2$SO$_4$), 50 parts by weight of catechol (Aldrich) and 42.5 parts by weight of Zn(DBS)$_2$ by method D. 30 parts of said plasticized complex has been mixed with 70 parts by weight high density polyethylene HDPE NCPE 3415 (Neste Oy) at 180° C. by using a single screw mixer. The achieved conductivity was 1.10$^{-4}$ S/cm.

One can conclude from Examples 23 and 24 that 2.25 wt-% of PANI(H$_2$SO$_4$) suffices to yield electrically conducting polymer blends. This is an astonishingly low value compared with conventional rigid particle percolation.

Example 25

4.4 parts by weight of PANI(H$_2$SO$_4$) was mixed with 95.6 parts by weight of o,p-toluene sulfonamide, which is not a molecular recognition compound, according to the definition above. Method B was used at 190° C. It is observed that PANI(H$_2$SO$_4$) is not soluble in o,p-toluene sulfonamide. 4.4 parts by weight PANI(H$_2$SO$_4$) was mixed with 95.6 parts by weight Zn(DBS)$_2$ prepared by the Method B. No signs of solubility are observed in this case. But when 4.4 parts by weight PANI(H$_2$SO$_4$) was mixed with 50 parts by weight o,p-toluene sulfonamide and 45.6 parts by weight Zn(DBS)$_2$ a solubilized complex is observed.

Therefore one can conclude that in combination with surfactants, even o,p-toluene sulfonamide is able to solubilize PANI(H$_2$SO$_4$). Although o,p-toluene sulfonamide does not have at least two hydrogen bondable moieties combined with one phenyl ring, it has one phenyl ring capable of van der Waals interaction combined with sulfonamide group which is known to have very large partial charge.

We claim:

1. A fluid-phase processible electrically conductive polymeric composition comprising an admixture of:

(a) at least one electrically conductive polymer selected from the group consisting of electrically conducting, protonated optionally substituted polyanilines, and copolymers thereof;
    (b) at least one aromatic compound having a pKa greater than 3 and selected from the group consisting of substituted aromatic compounds of Formulas (IV) to (X)

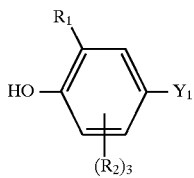

IV

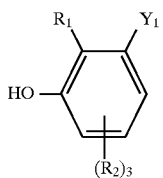

V

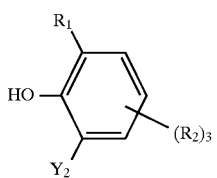

VI

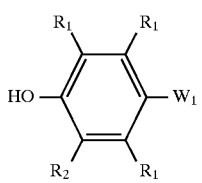

VII

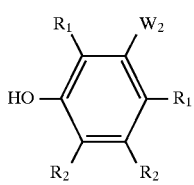

VIII

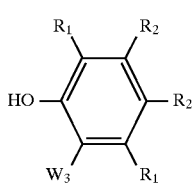

IX wherein:
each R$_1$, represents H, —OH, —F, —Cl, —CH$_3$ or —OCH$_3$, whereby at least one of the H's in —CH$_3$ or —OCH$_3$ can be substituted by —F or —Cl;
each R$_2$ is independently selected from the group consisting of —OH, alkyl, alkenyl, alkoxy, alkanoyl, alkylthio, alkylthioalkyl, alkyl amide, alkylamidealkyl, alkyl hydroxy, alkyl carboxyl, having from 1 to about at least 20 carbon atoms; or alkylaryl, arylalkyl, alkylsulfinyl, alkoxyalkyl, alkylsulfonyl, alkoxycarbonyl, wherein the alkyl or alkoxy has from 0 to about 20 carbon atoms; or alkyl having from 1 to about 20 carbon atoms; or any two $R_2$ groups together may form an alkylene or alkenylene chain completing a 3 or 7-membered aromatic or alicyclic ring, which ring may optionally include at least one nitrogen, sulfur or oxygen atom; $R_2$ can be branched and can be tert-alkyl, the alkyl having from 1 to about 20 carbon atoms; $R_2$ may include at least one polar substituent selected from the group consisting of —$NO_2$, —CN, —F, —Cl, —Br, and —I;

each $Y_1$ is independently selected from the group consisting of —OH, —COOH, —COO—Z, —CO—Z, —SO—Z, —$SO_2$—Z, —$SO_2$NH—Z and —OCOO—Z, wherein Z represents an alkyl having 1 to about 20 carbon atoms preferably more than about 10 carbon atoms;

each $Y_2$ is —OH;

each $W_1$ is independently selected from the group consisting of substituents of formulas $X_1$, —$C(C_nH_{2n+1})(C_mH_{2m+1})$—$X_1$, wherein n and m are integers from 1 to about at least 20, —COO—$X_1$, —CO—$X_1$, —OCO—$X_1$, —$CH_2$—O—$X_1$, —O—$CH_2$—$X_1$, —O—$X_1$, —S—$X_1$, —SO—$X_1$, $SO_2$—$X_1$, —$SO_2$NH—$X_1$, —OCOO—$X_1$, cyclohexane, or 5 or 6-membered aromatic, heteroalicyclic, heteroaromatic or alicyclic carbon ring;

each $W_2$ is independently selected from the group consisting of substituents of formulas $X_1$, —$C(C_nH_{2n+1})(C_mH_{2m+1})$—$X_1$, wherein n and m are integers from 1 to about at least 20, —COO—$X_1$, —CO—$X_1$, —OCO—$X_1$, —O—$X_1$, —S—$X_1$, —SO—$X_1$, —$SO_2$—$X_1$, —$SO_2$NH—$X_1$, —OCOO—$X_1$, —COO—$CH_2$—$X_1$, —OCO—$CH_2$—$X_1$, —$CH_2$—COO—$X_1$, —$CH_2$—OCO—$X_1$, —O—$C_2H_4$—O—$X_1$, cyclohexane, or 5 or 6-membered aromatic, heteroalicyclic, heteroaromatic or alicyclic carbon ring; and each $W_3$ is independently selected from the group consisting of substituents of formulas $X_1$, —$C(C_nH_{2n+1})(C_mH_{2m+1})$—$X_1$, wherein n and m are integers from 1 to about at least 20, —COO—$X_1$, —CO—$X_1$, —OCO—$X_1$, —O—$X_1$, —S—$X_1$, —SO—$X_1$, —$SO_2$—$X_1$, —OCOO—$X_1$, —$CH_2$—$X_1$, cyclohexane, or 5 or 6-membered aromatic, heteroalicyclic, heteroaromatic or alicyclic carbon ring; and each $X_1$ stands for a group of formula (X)

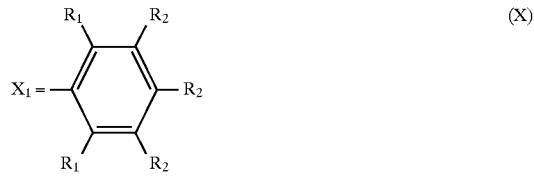

wherein $R_1$ and $R_2$ are as defined above; and (c) at least one surface active additive, wherein said substituted aromatic compound together with said surface active additive is capable of dissolving said electrically conductive polymer during processing.

2. A composition according to claim 1, wherein the surface active additive is an anionic surfactant selected from the group consisting of organic sulfonates, organic sulfates, organic phosphonates, and organic phosphates.

3. A composition according to claim 1, wherein, in Formulas (IV) to (X), at least one of the substituents $R_1$, $R_2$, $Y_1$, $Y_2$, $W_1$, $W_2$ and $W_3$ is adjacent to at least one —OH substituent on a benzene ring and is selected from the group consisting of —H and —OH.

4. A composition according to claim 1, wherein the electrical conductivity of the composition is at least about $10^{-9}$ S/cm.

5. A composition according to claim 1, wherein the electrical conductivity of the composition is at least about $10^{-6}$ S/cm.

6. A composition according to claim 1, wherein the electrical conductivity of the composition is at least about $10^{-3}$ S/cm.

7. A composition according to claim 1, wherein the aromatic compound is selected from the group consisting of alkyl substituted or unsubstituted hydroquinone, resorcinol, alkyl substituted or unsubstituted catechol, alkyl gallates, dihydroxy acetophenones, bisphenol A, bisphenol F, dihydroxy benzophenone, p-hydroxy benzoic acid, m-hydroxy benzoic acid, and the surface active additive from the group consisting of $Na^+$, $Zn^{2+}$, $Mg^{2+}$ or $Cu^{2+}$ salts of alkyl benzene sulfonic acid, or alkyl $Na^+$, $Zn^{2+}$, $Mg^{2+}$ or $Cu^{2+}$ sulfates or the $Na^+$, $Zn^{2+}$, $Mg^{2+}$ or $Cu^{2+}$ salts of naphthalene sulfonic acid.

* * * * *

UNITED STATES PATENT AND TRADEMARK OFFICE
CERTIFICATE OF CORRECTION

PATENT NO. : 5,866,043
DATED : Feb. 2, 1999
INVENTOR(S) : Ikkala et al.

It is certified that error appears in the above-identified patent and that said Letters Patent is hereby corrected as shown below:

Title page, item "[63] Related U.S. Application Data", please correct the application data as follows: -- Continuation-in-part of Ser. No. 257,115, filed June 8, 1994, Pat. No. 5,520,852 --.

In the Notice section, at [*] please make the following correction:

-- The term of this patent shall not extend beyond the expiration date of Pats. Nos. 5,520,852 and 5,783,111. --

Signed and Sealed this

Eighteenth Day of January, 2000

Attest:

Q. TODD DICKINSON

*Attesting Officer*  *Commissioner of Patents and Trademarks*